US012713368B2

(12) United States Patent
Lee et al.

(10) Patent No.: US 12,713,368 B2
(45) Date of Patent: Aug. 18, 2026

(54) METHOD OF DETECTING SYNCHRONIZATION TIMING AND SUB-BAND BASED ON ADAPTIVE THRESHOLD AND RECEIVER PERFORMING THE SAME

(71) Applicant: SAMSUNG ELECTRONICS CO., LTD., Suwon-si (KR)

(72) Inventors: Jinyong Lee, Suwon-si (KR); Jungwoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 286 days.

(21) Appl. No.: 18/403,395

(22) Filed: Jan. 3, 2024

(65) Prior Publication Data

US 2024/0244542 A1 Jul. 18, 2024

(30) Foreign Application Priority Data

Jan. 17, 2023 (KR) ........................ 10-2023-0006607

(51) Int. Cl.
*H04W 56/00* (2009.01)

(52) U.S. Cl.
CPC ....... *H04W 56/001* (2013.01); *H04W 56/003* (2013.01)

(58) Field of Classification Search
CPC .......................... H04W 56/001; H04W 56/003
See application file for complete search history.

(56) References Cited

U.S. PATENT DOCUMENTS 7,391,828 B2 6/2008 Liu et al.
7,746,760 B2 6/2010 Vijayan et al.
8,509,051 B2 8/2013 Ling et al.
9,491,025 B2 11/2016 Cheng et al.
12,040,921 B1 * 7/2024 Bruzzone .............. H04L 27/265
2006/0250939 A1 11/2006 Wang et al.
2012/0243626 A1 * 9/2012 Ma ......................... H04B 7/022 375/295
2012/0263167 A1 10/2012 Wang
2014/0105262 A1 * 4/2014 Alloin ................. H04L 27/2688 375/222
2020/0329449 A1 * 10/2020 Chowdhury ...... H04W 72/0446
2022/0200828 A1 6/2022 Lee et al.
2024/0129165 A1 * 4/2024 Bradley ............ H04L 25/03006

FOREIGN PATENT DOCUMENTS

KR 10-2022-0088256 A 6/2022

* cited by examiner

*Primary Examiner* — Khai M Nguyen
(74) *Attorney, Agent, or Firm* — Sughrue Mion, PLLC

(57) ABSTRACT

A method of detecting synchronization timing and sub-band, includes: receiving an input signal corresponding to a training sequence; generating a template signal based on the input signal and a single reference signal; performing a matched filtering operation on the input signal based on the template signal; obtaining an adaptive threshold for detecting a target sub-band based on a result of the matched filtering operation; obtaining a peak tone for the target sub-band based on the result of the matched filtering operation; and determining whether the input signal corresponds to the target sub-band and a synchronization timing for the input signal based on the adaptive threshold and the peak tone.

20 Claims, 25 Drawing Sheets

10
200
RECEIVER
230
SECOND CALCULATOR
A_THR_CAL
SYNC
B_IDX
PWR
210
FIRST CALCULATOR
TEM
TEMPLET GENERATOR
REF_LUT
220
I_SIG
201
SIG
101
100
TRANSMITTER

BSS/BW = 80/20, AWGN
Peak tone(sum)
Peak tone(sub band)
Noise variance
Power
SNR
140
120
100
80
60
40
20
0
−10
−5
0
5
10
15
20
25
30

BSS/BW = 160/160, AWGN
Peak tone(sum)
Peak tone(sub band)
Noise variance
Power
140
120
100
80
60
40
20
0
SNR
-10
-5
0
5
10
15
20
25
30

| b | | 4n | 4n+1 | 4n+2 | 4n+3 | |
|---|---|---|---|---|---|---|
| 0 | ··· | 113 | 112+18j | 107+37j | 99+54j | ··· |
| 1 | ··· | 113 | 66+92j | -37+107j | 109+31j | ··· |
| 2 | ··· | 113 | -18+112j | -107-37j | 54-99j | ··· |
| 3 | ··· | 113 | -92+66j | 37-107j | 31-109j | ··· |
| 4 | ··· | 113 | -112-18j | 107+37j | -99-54j | ··· |
| 5 | ··· | 113 | -66-92j | -37+107j | -109-31j | ··· |
| 6 | ··· | 113 | 18-112j | -107-37j | -54+99j | ··· |
| 7 | ··· | 113 | 92-66j | 37-107j | -31+109j | ··· |

FIG. 8B

| R(0,4n) | R(0,4n+1) | R(0,4n+2) | R(0,4n+3) |
| --- | --- | --- | --- |
| - | R(1,4n+1) | - | R(1,4n+3) |
| R(2,4n) | R(2,4n+1) | R(2,4n+2) | R(2,4n+3) |
| - | R(3,4n+1) | - | R(3,4n+3) |

FIG. 8C

| m | | 4n | 4n+1 | 4n+2 | 4n+3 | |
| --- | --- | --- | --- | --- | --- | --- |
| 0 | ··· | 0 | 18 | 37 | 54 | ··· |
| 1 | ··· | - | 92 | - | 31 | ··· |
| 2 | ··· | 113 | 112 | 107 | 99 | ··· |
| 3 | ··· | - | 66 | - | 109 | ··· |

| m | | 4n | 4n+1 | 4n+2 | 4n+3 | |
|---|---|---|---|---|---|---|
| 0 | ··· | 0 | 0 | 0 | 1 | ··· |
| 1 | ··· | – | 1 | – | 0 | ··· |
| 2 | ··· | 1 | 1 | 1 | 1 | ··· |
| 3 | ··· | – | 1 | – | 1 | ··· |

FIG. 11A

Valid band

Peak
Threshold

Power
0 1 2 3 4 5 6 7 8 9 10

Sample index
200 400 600 800 1000 1200 1400

Figure 14:
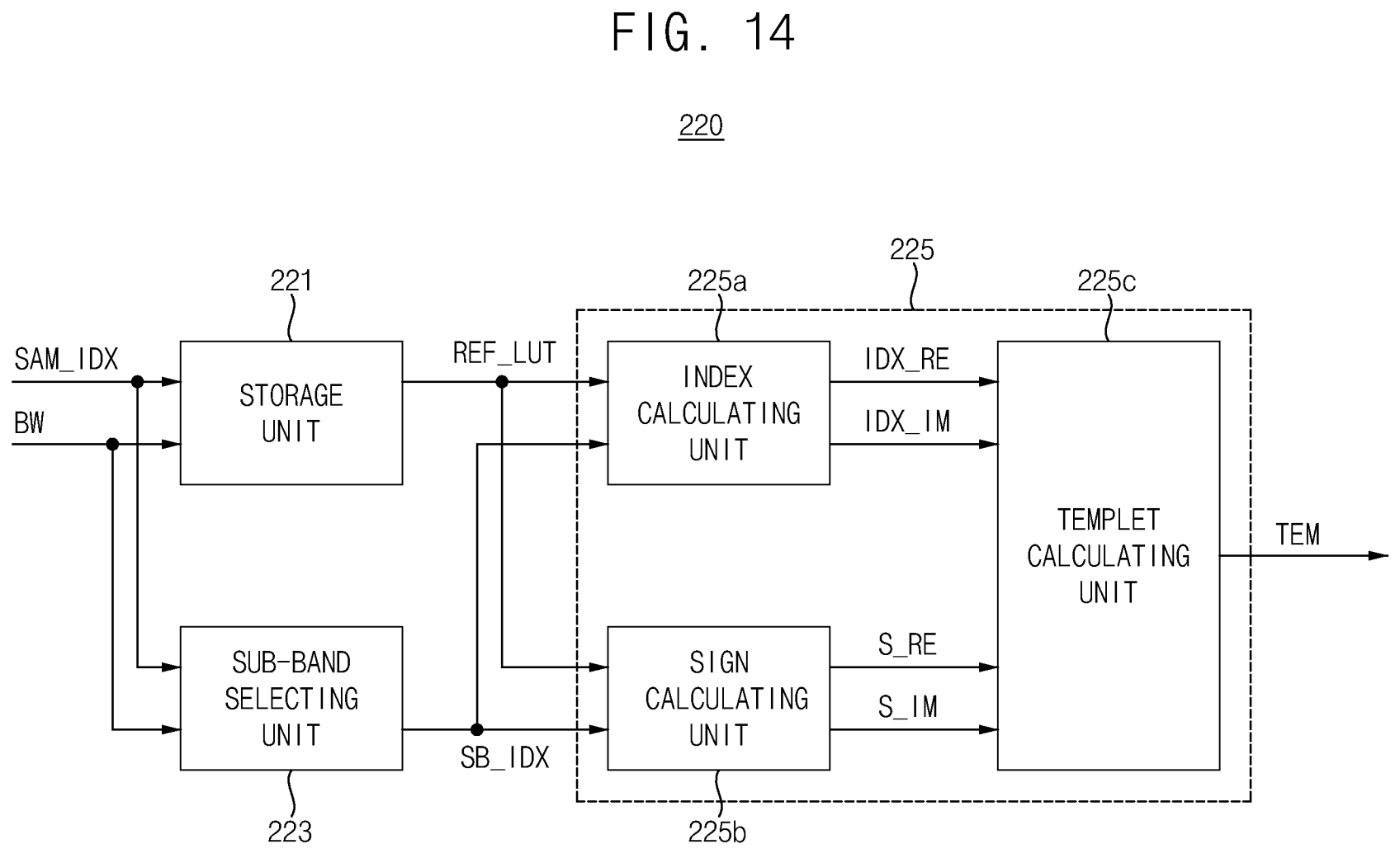

SAM_IDX
BW
221
STORAGE UNIT
223
SUB-BAND SELECTING UNIT
REF_LUT
SB_IDX
225
225a
INDEX CALCULATING UNIT
225b
SIGN CALCULATING UNIT
IDX_RE
IDX_IM
S_RE
S_IM
225c
TEMPLET CALCULATING UNIT
TEM

Misdetection ratio
CH D, existing
CH D, proposed
AWGN, existing
AWGN, proposed
Error rate
0
0.05
0.1
0.15
0.2
0.25
0.3
0.35
0.4
0.45
SNR(dB)
-10
-8
-6
-4
-2
0
2
4
6
8

False alarm ratio
CH D, existing
CH D, proposed
AWGN, existing
AWGN, proposed
Error rate
SNR(dB)
0.014
0.012
0.01
0.008
0.006
0.004
0.002
0
-10
-8
-6
-4
-2
0
2
4
6
8

METHOD OF DETECTING SYNCHRONIZATION TIMING AND SUB-BAND BASED ON ADAPTIVE THRESHOLD AND RECEIVER PERFORMING THE SAME

CROSS-REFERENCE TO RELATED APPLICATION

This application claims priority under 35 U.S.C. § 119 to Korean Patent Application No. 10-2023-0006607 filed on Jan. 17, 2023 in the Korean Intellectual Property Office, the contents of which are incorporated by reference herein in their entirety.

BACKGROUND

1. Technical Field

Example embodiments of the present disclosure relate generally to semiconductor integrated circuits, and more particularly to methods of detecting synchronization timing and sub-band based on adaptive threshold, and receivers performing the methods.

2. Description of Related Art

A wireless communication system is a system used to communication data or information using light waves between electronic devices. Mobile phones, computers, and navigation systems use wireless communication to send and receive information between devices.

In a wireless communication system, a strong communication signal is important. In particular, the highest possible signal-to-noise ratio (SNR) is desired at a receiving device. Similarly, for a wireless fidelity (WiFi) system, increasing the SNR at the receiving device increases the probability that information is correctly received, and reduces the amount of retransmissions used from a source. Some methods of achieving better SNR at the receiver end is to increase power transmission, decrease the distance between the source and the receiver, or increase antenna gain.

With persistent changes in wireless communication standards, communication in a relatively wide frequency bandwidth is required to maintain an acceptable signal. For example, in a wireless local area network (WLAN) system such as a WiFi system, a standard operating in a bandwidth of about 160 MHz or more has been proposed. Methods for synchronization timing and sub-band detection are based on the band split in a time domain. As a result, performance is affected and more filter coefficients, computational complexity, and delay time are required to reduce the size of transition band. Therefore, there is a need in the art for improved synchronization timing and sub-band detection.

SUMMARY

One or more example embodiments of the present disclosure provide a method of detecting synchronization timing and sub-band in a wireless communication system capable of efficiently performing synchronization using a single reference signal and an adaptive threshold.

One or more example embodiments of the present disclosure provide a receiver included in a wireless communication system and performing the method of detecting synchronization timing and sub-band.

According to an aspect of an example embodiment, a method of detecting synchronization timing and sub-band, includes: receiving an input signal corresponding to a training sequence; generating a template signal based on the input signal and a single reference signal; performing a matched filtering operation on the input signal based on the template signal; obtaining an adaptive threshold for detecting a target sub-band based on a result of the matched filtering operation; obtaining a peak tone for the target sub-band based on the result of the matched filtering operation; and determining whether the input signal corresponds to the target sub-band and a synchronization timing for the input signal based on the adaptive threshold and the peak tone.

According to an aspect of an example embodiment, a receiver including: one or more processors including: a template generator configured to generate a template signal based on an input signal and a single reference signal, the input signal corresponding to a training sequence; a first calculator configured to receive the input signal, and to perform a matched filtering operation on the input signal based on the template signal; and a second calculator configured to obtain an adaptive threshold for detecting a target sub-band based on a result of the matched filtering operation, to obtain a peak tone for the target sub-band based on the result of the matched filtering operation, and to determine whether the input signal corresponds to the target sub-band and a synchronization timing for the input signal based on the adaptive threshold and the peak tone.

According to an aspect of an example embodiment, a method of detecting synchronization timing and sub-band, the method including: receiving an input signal corresponding to a training sequence; generating a template signal based on the input signal and a single reference signal; performing a matched filtering operation on the input signal based on the template signal; setting a valid range based on a result of the matched filtering operation; obtaining an adaptive threshold for detecting a target sub-band based on the result of the matched filtering operation and the valid range; obtaining a peak tone for the target sub-band based on the result of the matched filtering operation and the valid range; and determining whether the input signal corresponds to the target sub-band and a synchronization timing for the input signal based on the adaptive threshold and the peak tone, wherein obtaining the adaptive threshold includes: measuring a noise power by performing a windowing operation around a target position of the input signal; and obtaining the adaptive threshold based on the noise power, and wherein generating the template signal includes: calling a single look-up table corresponding to the reference signal; obtaining a frequency bandwidth of the input signal; obtaining a sub-band index of the input signal; and obtaining the template signal based on the look-up table, the frequency bandwidth and the sub-band index.

BRIEF DESCRIPTION OF THE DRAWINGS

Illustrative, non-limiting example embodiments will be more clearly understood from the following detailed description taken in conjunction with the accompanying drawings, in which:

FIG. 7 is a flowchart illustrating an example of generating a template signal in FIG. 1;

FIGS. 8A, 8B, 8C and 8D are diagrams for describing an operation of FIG. 7;

FIG. 9 is a flowchart illustrating an example of obtaining a template signal in FIG. 7;

FIGS. 11A, 11B, 12A and 12B are diagrams for describing an effect of a method of detecting synchronization timing and sub-band according to one or more example embodiments;

FIG. 14 is a block diagram illustrating an example of a template generator included in a receiver of FIG. 2;

DETAILED DESCRIPTION

Figure 1:
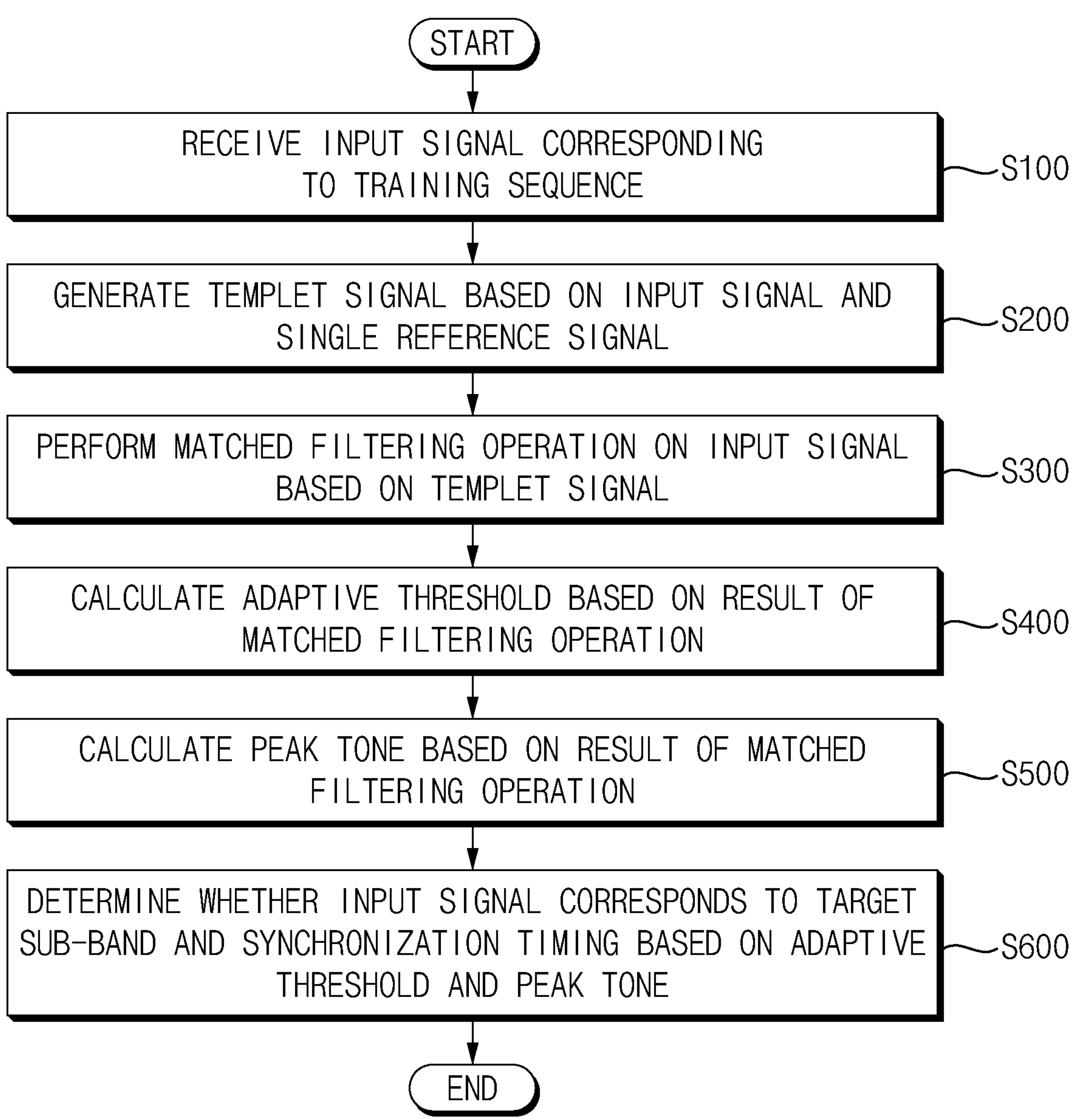
FIG. 1 is a flowchart illustrating a method of detecting synchronization timing and sub-band according to one or more example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a flowchart illustrating a method of detecting synchronization timing and sub-band according to one or more example embodiments.

Referring to FIG. 1, a method of detecting synchronization timing and sub-band according to one or more example embodiments is performed by a receiver that receives a signal from a transmitter in a wireless communication system. Detailed configurations of the receiver and a wireless communication system including the receiver will be described with reference to FIG. 2.

In the method of detecting synchronization timing and sub-band according to one or more example embodiments, an input signal corresponding to a training sequence is received (operation S100). The input signal may be referred to as a received signal or a reception signal. For example, the training sequence may be used for synchronization of signal transmission between the transmitter and the receiver in the wireless communication system.

A template signal is generated based on the input signal and a reference signal that is a single reference signal (operation S200). Unlike a conventional method in which a template signal corresponding to a specific sub-band is generated using one of a plurality of reference signals, a template signal corresponding to an arbitrary sub-band may be generated according to one or more example embodiments using a single reference signal, and thus the computational complexity may be reduced. Operation S200 will be described in detail with reference to FIGS. 7, 8A, 8B, 8C and 9.

A matched filtering operation is performed on the input signal based on the template signal (operation S300). For example, the presence or absence of a sub-band signal may be determined (or identified or checked) according to one or more example embodiments based on a wideband matched filtering scheme, and the template signal may correspond to filter coefficients of the matched filtering operation (e.g., a matched filter). For example, the matched filtering operation may be performed using a cross-correlation function (CCF), and a result of the matched filtering operation may be provided as a power value. For example, a quantization operation may be performed on the input signal before the matched filtering operation is performed.

An adaptive threshold for detecting a target sub-band is calculated based on the result of the matched filtering operation (operation S400). Unlike a conventional method in which a sub-band is detected using a fixed (or constant) threshold, a sub-band may be detected according to one or more example embodiments using an adaptive threshold having a variable (or changeable) value, and thus the detection accuracy may be improved. Operation S400 will be described in detail with reference to FIGS. 4, 5A, 5B and 6.

A peak tone for the target sub-band is calculated based on the result of the matched filtering operation (operation S500). For example, only a peak tone for a specific sub-band may be calculated. Alternatively, a combined peak tone may be calculated by combining peak tones for two or more sub-bands.

Based on the adaptive threshold and the peak tone, it is determined whether the input signal corresponds to the target sub-band, and a synchronization timing for the input signal is determined (operation S600). For example, when the input signal corresponds to the target sub-band, the synchronization timing for the input signal may be set based on the target sub-band. Operation S600 will be described in detail with reference to FIG. 10.

A communication may be performed between the transmitter and the receiver included in the wireless communication system based on the synchronization timing determined by operation S600.

Typically, a synchronization timing may be detected with respect to the maximum value of CCF for a training sequence of a received signal, and a sub-band may be detected by determining whether the training sequence is included in each sub-band. Conventionally, a synchronization timing and a corresponding sub-band signal were detected and determined using a band split filtering scheme. For example, the maximum value for a result of each band split filtering was derived using the CCF characteristics of a specific training sequence, and the synchronization timing was detected and the corresponding sub-band signal was determined using a fixed threshold.

In the method of detecting synchronization timing and sub-band according to one or more example embodiments, the presence or absence of a sub-band signal may be determined based on the wideband matched filtering scheme, and the sub-band detection in consideration of a wireless channel environment may be performed using the adaptive threshold. In addition, template signals corresponding to various bandwidths and sub-bands may be generated using a single reference signal. Accordingly, the computational complexity may be reduced, and the detection accuracy of the synchronization timing may be improved or enhanced. For example, both the misdetection ratio representing a probability of not detecting valid (or effective) sub-bands and the false alarm ratio representing a probability of detecting non-existent sub-bands may be reduced, thereby improving the detection accuracy.

Figure 2:
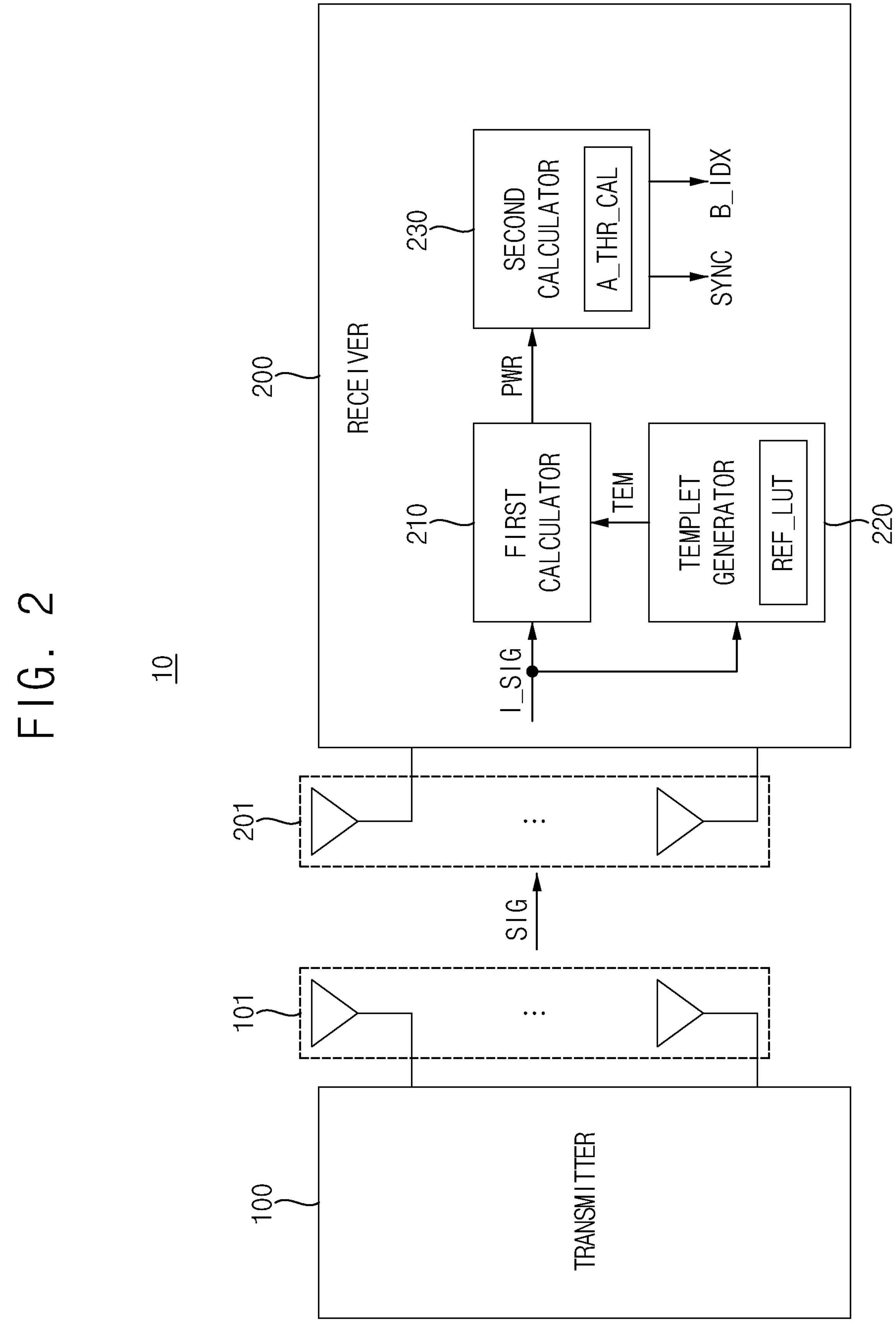
FIG. 2 is a block diagram illustrating a receiver and a wireless communication system including the receiver according to one or more example embodiments.

FIG. 2 is a block diagram illustrating a receiver and a wireless communication system including the receiver according to one or more example embodiments.

Referring to FIG. 2, a wireless communication system 10 includes a transmitter 100 and a receiver 200. The wireless communication system 10 may further include a channel (e.g., a wireless channel) formed as a signal transmission path between the transmitter 100 and the receiver 200.

In some one or more example embodiments, the wireless communication system 10 may be a wireless communication system that is implemented or formed based on a wireless local area network (WLAN). For example, the wireless communication system 10 may be a wireless communication system that is implemented or formed based on a wireless fidelity (WiFi). For example, the WLAN system may be implemented based on the Institute of Electrical and Electronics Engineers (IEEE) 802.11 standard, the IEEE 802.11ac standard or the IEEE 802.11ax standard, or may be implemented based on the IEEE 802.11be standard that is a next generation standard.

In the WLAN system, a communication may be performed between the transmitter 100 and the receiver 200 based on an orthogonal frequency division multiplexing (OFDM) scheme. The OFDM scheme is a wideband modulation technology for dividing a frequency bandwidth assigned for a communication session into a plurality of narrowband frequency sub-bands. Each of the narrowband frequency sub-bands may include a radio frequency (RF) sub-carrier. Each sub-carrier may be mathematically orthogonal to the RF sub-carrier included in each of the other sub-channels.

The OFDM scheme is a multi-carrier modulation technology in which data to be transmitted is primarily converted into a complex symbol in the form of M-ary quadrature amplitude modulation (QAM). A complex symbol sequence or a series of complex symbols may be converted into a plurality of parallel complex symbols through a serial-to-parallel conversion. Each of the parallel complex symbols may be rectangular pulse-shaped and sub-carrier modulated. In the multi-carrier modulation technology, the frequency interval between the sub-carriers may be set such that some or all sub-carrier modulated parallel complex symbols are orthogonal. Therefore, in the OFDM scheme, spectrums of the sub-carriers may be overlapped with one another without interruption by other carriers due to the orthogonality of the sub-carriers. Since the frequency bandwidth is divided into a plurality of orthogonal sub-bands, a high data transmission speed and an efficient use of a bandwidth may be possible.

In the WLAN system in which the communication is performed based on the OFDM scheme, the performance of the system may be improved or enhanced when the synchronization timing and the sub-band for the input signal (or received signal) are accurately and efficiently detected at an initial operation time.

Hereinafter, operations of the wireless communication system 10 and the receiver 200 according to one or more example embodiments will be described with a focus on operation of detecting the synchronization timing and the sub-band for the input signal at the initial operation time. However, embodiments are not limited thereto. After detecting the synchronization timing and the sub-band, the wireless communication system 10 may perform a normal signal (or data) transmission based on the synchronization timing.

The transmitter 100 transmits a signal SIG used to detect the synchronization timing and the sub-band. For example, the signal SIG may be provided in the form of a packet, and may correspond to a training sequence. The transmitter 100 may be referred to as an access point (AP).

The transmitter 100 may include a plurality of antennas (or transmission antennas) 101. The transmitter 100 may transmit or output the signal SIG using the plurality of antennas 101.

The receiver 200 receives an input signal ISIG corresponding to the signal SIG from the transmitter 100 through the channel, and detects the synchronization timing and the sub-band based on the input signal I_SIG. The receiver 200 may be referred to as a station (STA).

For example, the receiver 200 may generate a template signal TEM based on a single reference signal and the input signal I_SIG, may perform a matched filtering operation on the input signal I_SIG based on the template signal TEM, may calculate power PWR of the input signal I_SIG as a result of the matched filtering operation, may calculate an adaptive threshold and a peak tone for a target sub-band based on the result of the matched filtering operation, may determine whether the input signal I_SIG corresponds to the target sub-band based on the adaptive threshold and the peak tone, may determine the synchronization timing for the input signal I_SIG based on the adaptive threshold and the peak tone. When the input signal I_SIG corresponds to the target sub-band, the receiver 200 may generate a sub-band index signal B_IDX representing the target sub-band and a synchronization signal SYNC representing the synchronization timing that is set based on the target sub-band.

The receiver 200 includes a first calculator 210, a template generator 220 and a second calculator 230. The receiver 200 may further include a plurality of antennas (or reception antennas) 201. The first calculator 210, the template generator 220 and the second calculator 230 may be implemented by one or more processors.

The receiver 200 may receive the input signal I_SIG from the transmitter 100 through the channel using the plurality of antennas 201. As described above, the channel (e.g., wireless channel) may be formed between the plurality of antennas 101 of the transmitter 100 and the plurality of antennas 201 of the receiver 200.

The first calculator 210 may receive the input signal I_SIG, may perform the matched filtering operation on the input signal I_SIG based on the template signal TEM, and may calculate the power PWR of the input signal I_SIG. In other words, the first calculator 210 may perform operations S100 and S300 in FIG. 1.

The template generator 220 may generate the template signal TEM based on the single reference signal and the input signal I_SIG. In other words, the template generator 220 may perform operation S200 in FIG. 1.

The template generator 220 may include a single look-up table (LUT) REF_LUT corresponding to the single reference signal. The template generator 220 may be implemented to generate or form template signals corresponding to various bandwidths and sub-bands by extensions from the single reference signal (e.g., the single look-up table REF_LUT).

The second calculator 230 may calculate the adaptive threshold and the peak tone based on the result of the matched filtering operation, may determine whether the input signal I_SIG corresponds to the target sub-band based on the adaptive threshold and the peak tone, and may determine the synchronization timing for the input signal I_SIG based on the adaptive threshold and the peak tone. In other words, the second calculator 230 may perform operations S400, S500 and S600 in FIG. 1.

The second calculator 230 may include a threshold calculating unit A_THR_CAL that generates the adaptive threshold. The second calculator 230 may be implemented to perform the sub-band detection in consideration of the wireless channel environment by calculating the adaptive threshold and the peak tone suitable for the wireless channel.

Detailed configurations of the first calculator 210, the template generator 220 and the second calculator 230 will be described in detail with reference to FIGS. 13, 14 and 15.

Typically, types of sub-bands applicable to a corresponding frequency bandwidth and coefficients of the matched filter corresponding thereto may be derived by checking the sampling rate (e.g., maximum frequency bandwidth) of the received signal. A template signal corresponding to the coefficients of the matched filter may be derived and calculated from a basic training sequence, but the computational complexity may increases for calculating the template signal in real-time. To solve this problem, a pre-calculated reference signal may be stored in the look-up table, and the pre-stored reference signal may be called and used. However, as the frequency bandwidth increases, the size of the look-up table may increase, which imposes a burden on hardware configuration.

In the method of detecting synchronization timing and sub-band and the receiver according to one or more example embodiments, a sub-band index-based template extension and construction technique (or simply an indexing technique) may be used to reduce the computational complexity and the size of the look-up table. For example, only the single reference signal corresponding to the maximum frequency bandwidth supported by the system may be stored in the look-up table, and the template signal corresponding to a required frequency bandwidth and sub-band may be generated or formed by extending and constructing the template signal using the single reference signal.

In addition, in the method of detecting synchronization timing and sub-band and the receiver according to one or more example embodiments, the matched filtering operation may be performed on the received signal using the template signal, a value corresponding to the power of the received signal may be provided as an output value, and the adaptive threshold and the peak tone in consideration of the wireless channel environment may be calculated based on the output value. In one or more example embodiments, when the received signal corresponds to multiple sub-bands, multiple peak tones corresponding to the multiple sub-bands may be combined to calculate a combined peak tone for detecting and updating the synchronization timing. Thereafter, the presence or absence of a corresponding sub-band may be determined by comparing the peak tone with the adaptive threshold, and the final sub-band index may be updated when the corresponding sub-band is detected.

Figure 3A:
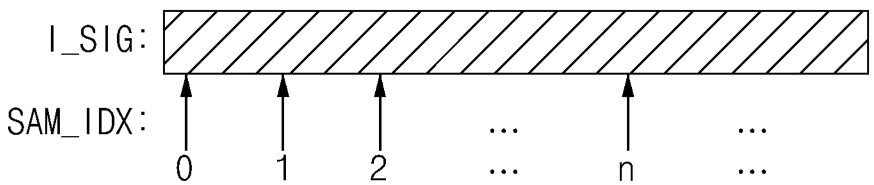
FIGS. 3A and 3B are diagrams for describing an operation of a receiver and a wireless communication system according to one or more example embodiments.
Figure 3B:
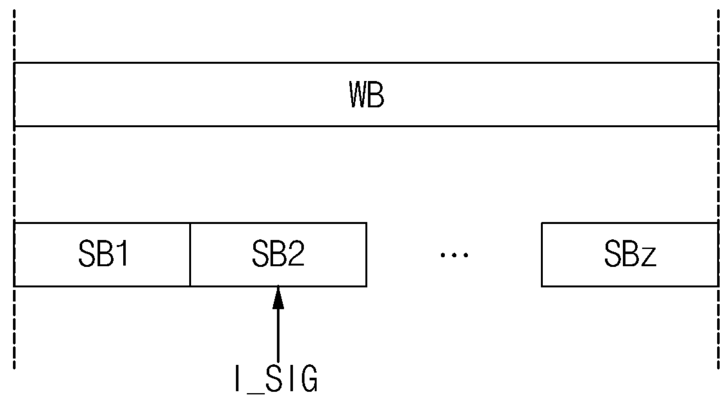

FIGS. 3A and 3B are diagrams for describing an operation of a receiver and a wireless communication system according to one or more example embodiments.

Referring to FIG. 3A, configuration and processing in a time domain of the input signal I_SIG received by the receiver 200 is illustrated. For example, a sampling operation, a generation of the template signal and a matched filtering operation (e.g., cross-correlation function) may be performed by periodically setting sample indices SAM_IDX on the input signal I_SIG. For example, the input signal I_SIG may be an OFDM signal, and the input signal I_SIG may include a plurality of OFDM symbols. The sample indices SAM_IDX may be referred to as time indices.

For example, at a first time point, a first sampling value may be obtained by sampling the input signal I_SIG, a first sample index (e.g., "0") for the first sampling value may be obtained, and the generation of the template signal and the matched filtering operation (or cross-correlation function) may be performed based on the first sampling value. Next, at a second time point elapsed by a sampling interval from the first time point, a second sampling value may be obtained by sampling the input signal I_SIG, a second sample index (e.g., "1") for the second sampling value may be obtained, and the generation of the template signal and the matched filtering operation (or cross-correlation function) may be performed based on the second sampling value. Further, at a third time point elapsed by the sampling interval from the second time point, a third sampling value may be obtained by sampling the input signal I_SIG, a third sample index (e.g., "2") for the third sampling value may be obtained, and the generation of the template signal and the matched filtering operation (or cross-correlation function) may be performed based on the third sampling value. Similarly, at an (n+1)-th time point, an (n+1)-th sampling value may be obtained by sampling the input signal I_SIG, an (n+1)-th sample index (e.g., "n") for the (n+1)-th sampling value may be obtained, and the generation of the template signal and the matched filtering operation (or cross-correlation function) may be performed based on the (n+1)-th sampling value.

Referring to FIG. 3B, configuration and processing in a frequency domain of the input signal I_SIG received by the receiver 200 is illustrated.

As described with reference to FIG. 2, the input signal I_SIG may be received through the wireless channel of the wireless communication system 10. The wireless channel may have a frequency bandwidth of a wideband WB including a plurality of sub-bands SB1, SB2, . . . , SBz, and the input signal I_SIG may correspond to one of the plurality of sub-bands SB1 to SBz. For example, the input signal I_SIG may correspond to the sub-band SB2. However, embodiments are not limited thereto, and the input signal I_SIG may correspond to two or more sub-bands.

In one or more example embodiments, as will be described with reference to FIG. 17, the method of detecting synchronization timing and sub-band may be performed for or on each of the plurality of sub-bands SB1 to SBz. For example, when the sub-band SB1 is the target sub-band of FIG. 1, it may be determined that the input signal I_SIG does not correspond to the target sub-band. For example, when the sub-band SB2 is the target sub-band of FIG. 1, it may be determined that the input signal I_SIG corresponds to the target sub-band.

In one or more example embodiments, as will be described with reference to FIG. 16, a valid range (or effective range) corresponding to at least a part of the plurality of sub-bands SB1 to SBz may be set, and the method of detecting synchronization timing and sub-band may be performed for or on the valid range among the plurality of sub-bands SB1 to SBz.

In signal modeling, an OFDM signal transmitted in the OFDM scheme may generally use a training sequence in which a specific unit band is repeated in a frequency domain to have pseudo noise (PN) characteristics in a time domain. A(τ) may be obtained based on Equation 1, if an arbitrary unit band training sequence of a length $N_{sub}$ with the PN characteristics in both the time and frequency domains is defined as $X_{N_{sub}}(k)$ in the frequency domain, which is an auto-correlation function (ACF) value calculated by performing the auto-correlation function on $X_{N_{sub}}(k)$.

$$A(\tau) = \frac{1}{N_{sub}} \sum_{k=0}^{N_{sub}-1} X_{N_{sub}}(k) \cdot X^{*}_{N_{sub}}((k+\tau) \ \% \ N_{sub}) = \delta(\tau) \quad \text{[Equation 1]}$$

If a wideband signal sequence formed by repeating the arbitrary unit band training sequence $X_{N_{sub}}(k)$ sub is defined as $x_{sub}(n)$ in the time domain, $x_{sub}(n)$ may be represented by Equation 2, and a(n), which is an auto-correlation function value of $x_{sub}(n)$, may be obtained based on Equation 3.

$$x_{sub}(n) = \sum_{k=0}^{Nsub-1} X_{N_{sub}}(k) \cdot W^{kn}_{N_{sub}} \quad \text{[Equation 2]}$$

$$a(n) = \frac{1}{N_{sub}} \sum_{m=0}^{N_{sub}-1} x_{sub}(m) \cdot x^{*}_{sub}(m+n) = \delta(n) \quad \text{[Equation 3]}$$

The auto-correlation (or the auto-correlation function), also known as serial correlation, is the correlation of a signal with a delayed copy of itself as a function of delay. In other words, the auto-correlation is the similarity between observations as a function of the time lag between the observations. The analysis of the auto-correlation is a mathematical tool for finding repeating patterns, such as the presence of a periodic signal obscured by noise, or identifying the missing fundamental frequency in a signal implied by the harmonic frequencies of the signal. The auto-correlation may be used in signal processing for analyzing functions or series of values, such as time-domain signals.

A wideband signal including the arbitrary unit band training sequence $X_{N_{sub}}(k)$ with a position index "b" is defined based on Equation 4, Equation 5 and Equation 6, and $a_{b_1},b_2$ (n), which is calculated by performing the cross-correlation function on the wideband signal, may be represented by Equation 7.

$$X_{N,b}(k) = \begin{cases} X_{N_{sub}}(k \ \% \ N_{sub}) & \text{for } b \times N_{sub} \le k < (b+1) \times N_{sub} \\ 0 & \text{others} \end{cases} \quad \text{[Equation 4]}$$

$$x_{N,b}(n) \sum_{k=b \cdot N_{sub}}^{(b+1) \cdot N_{sub}-1} X_{N_{sub}}(k \ \% \ N_{sub}) \cdot W^{kn}_{N} \quad \text{[Equation 5]}$$

$$x_{N,b}(n) = \sum_{k=0}^{N_{sub}-1} X_{N_{sub}}(k) \cdot W_N^{(k+b \cdot N_{sub})n} \quad \text{[Equation 6]}$$

$$a_{b_1,b_2}(n) = \sum_{m=0}^{N-1} x_{N,b_1}(m) \cdot x^{*}_{N,b_2}(m+n) \quad \text{[Equation 7]}$$

In signal processing, the cross-correlation (or the cross-correlation function) is a measure of similarity of two series as a function of the displacement of one relative to the other. The cross-correlation is also known as a sliding dot product or sliding inner-product. The cross-correlation is commonly used for searching a long signal for a shorter, known feature. The cross-correlation has applications in pattern recognition, single particle analysis, electron tomography, averaging, cryptanalysis, and neurophysiology. The cross-correlation is similar in nature to the convolution of two functions.

Additionally, or alternatively, $a_{b_1,b_2}$ (0) may satisfy Equation 8 by Parseval's theorem between the time domain and the frequency domain.

$$a_{b_1 b_2}(0) = \sum_{m=0}^{N-1} x_{N,b_1}(m) \cdot x^{*}_{N,b_2}(m) = \sum_{k=0}^{N-1} X_{N,b_1}(k) \cdot X_{N,b_2}(k) = \begin{cases} \sum_{k=0}^{N_{sub}-1} |X_{N_{sub}}(k)|^2 & \text{for } b_1 = b_2 \\ 0 & \text{others} \end{cases} \quad \text{[Equation 8]}$$

Based on the above descriptions and Equations, a training sequence of a transmitted signal using wideband may be defined based on Equation 9, as the sum of $x_{N,b}(n)$.

$$x_{N,[B]}(n) = \sum_{b \in B} x_{N,b}(n) \quad \text{[Equation 9]}$$

An arbitrary received signal (or input signal) including $X_{N,\{B\}}(n)$ may have a peak value for a specific time index as a result of cross-correlation function for a reference signal $x_{N,b}(n)$, and various applications such as synchronization timing detection and sub-band detection may be performed based on such characteristics. If the maximum number of sub-bands that can be included in the wideband is $N_{Max}$ and the number of valid sub-bands actually included in the wideband is $N_B$, a peak value of an output of the cross-correlation function may be represented by Equation 10 with respect to filter coefficients of a length $N_{MF}$, when average power of the training sequence is normalized to one.

$$|a_{\{B\},b}(n)| = \begin{cases} \frac{N_{MF}}{N_B} & \text{for } n = 0 \text{ and } b \in B \\ 0 & \text{others} \end{cases} \quad \text{[Equation 10]}$$

If it is considered that an impulse response h(n) of a wireless channel having a multi-path of a length $L_w$, a received signal y(n) may be represented in the form of convolution by Equation 11.

$$y_{N,\{B\}}(n) = h(n) * x_{N,\{B\}}(n) = \sum_{l=0}^{L_w-1} h(l) \cdot x_{N,\{B\}}(n-l) \quad \text{[Equation 11]}$$

The impulse response h(n) may be a component in a wideband channel having a multi-path, and may be expressed as the sum of impulse responses $h_b(n)$ of arbitrary sub-band channels. Although $h_b(n)$ can be exactly derived by decomposing the sub-bands of h(n), the actual calculation for $h_b(n)$ may not be necessary. Therefore, for simplicity of calculation, assuming a sub-band channel $h_b(n)$ having a length $L_b$ greater than the length $L_w$, a relationship between h(n) and $h_b(n)$ may be represented by Equation 12, and a result of cross-correlation function therefor may be represented by Equation 13.

$$h(n) = \sum_{b=0}^{N_{Max}-1} h_b(n) \text{ for } n = 0, 1, \ldots (L_b - 1) \quad \text{[Equation 12]}$$

$$|a_{y,b}(n)| = \begin{cases} \frac{N_{MF}}{N_B}|h_b(n)|^2 & \text{for } n = 0, 1, \ldots (L_b - 1) \text{ and } b \in B \\ 0 & \text{others} \end{cases} \quad \text{[Equation 13]}$$

The result of cross-correlation function (or CCF value) in Equation 13 may correspond to the result of the matched filtering operation performed in S300 of FIG. 1.

In addition, a peak tone $P_b(n)$ for each sub-band may be calculated by Equation 14, based on a windowing operation with a length $L_{target}$ considering the wireless channel.

$$P_b(0) = \frac{N_{MF}}{N_B} \sum_{l=0}^{L_{target}-1} |h_b(l)|^2 \quad \text{[Equation 14]}$$

In other words, the peak tone calculated in S500 of FIG. 1 may be obtained based on Equation 14. In Equation 14, $P_b(0)$ denotes the peak tone obtained from $P_b(n)$ when n=0, and n denotes a sample index, where n=0 may represent a peak tone for a current sample index. In addition, as described above, $N_{MF}$ denotes the length of filter coefficients for the matched filtering operation, $N_B$ denotes the number of valid sub-bands included in the wideband, $L_{target}$ denotes the window size for the windowing operation, and $h_b(\cdot)$ denotes the impulse response of the sub-band channel.

In one or more example embodiments, in S500, not only the peak tone $P_b(n)$ for a specific sub-band but also a combined peak tone $P_B(n)$ obtained by combining peak tones for all sub-bands may be obtained. For example, if the wireless channel is close to flat fading, a result of combining the peak tones for all sub-bands, e.g., the combined peak tone may be represented by Equation 15.

$$P_B(0) = \frac{N_{MF}}{N_B} \sum_{b \in B} \left( \sum_{l=0}^{L_{target}-1} |h_b(l)|^2 \right) \cong N_{MF} \sum_{l=0}^{L_{target}-1} |h_b(l)|^2 \quad \text{[Equation 15]}$$

In Equation 15, $P_B(0)$ denotes the combined peak tone obtained from $P_B(n)$ when n=0.

Figure 4:
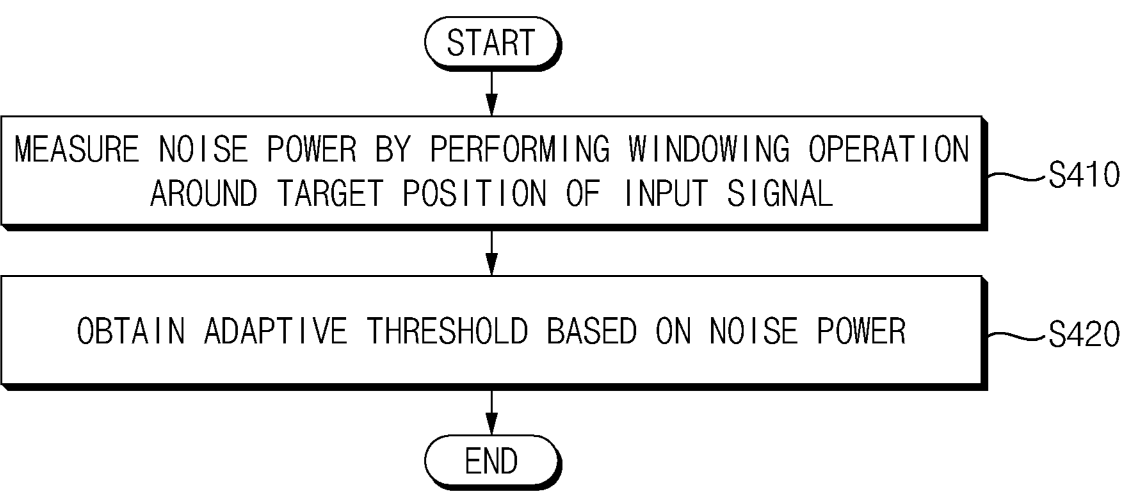
FIG. 4 is a flowchart illustrating an example of calculating an adaptive threshold in FIG. 1.
Figure 5A:
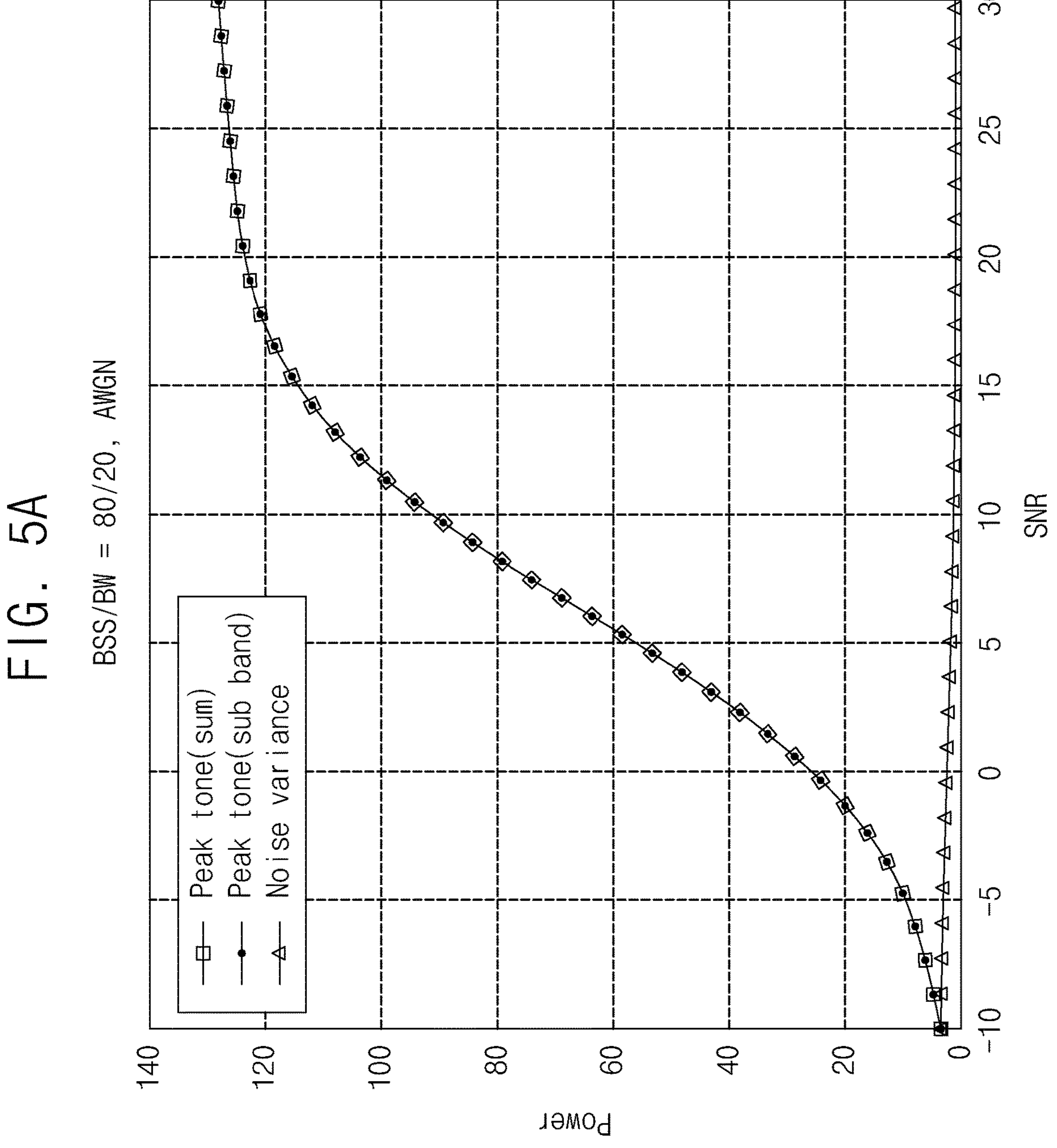
FIGS. 5A, 5B and 6 are diagrams for describing an operation of FIG. 4.
Figure 5B:
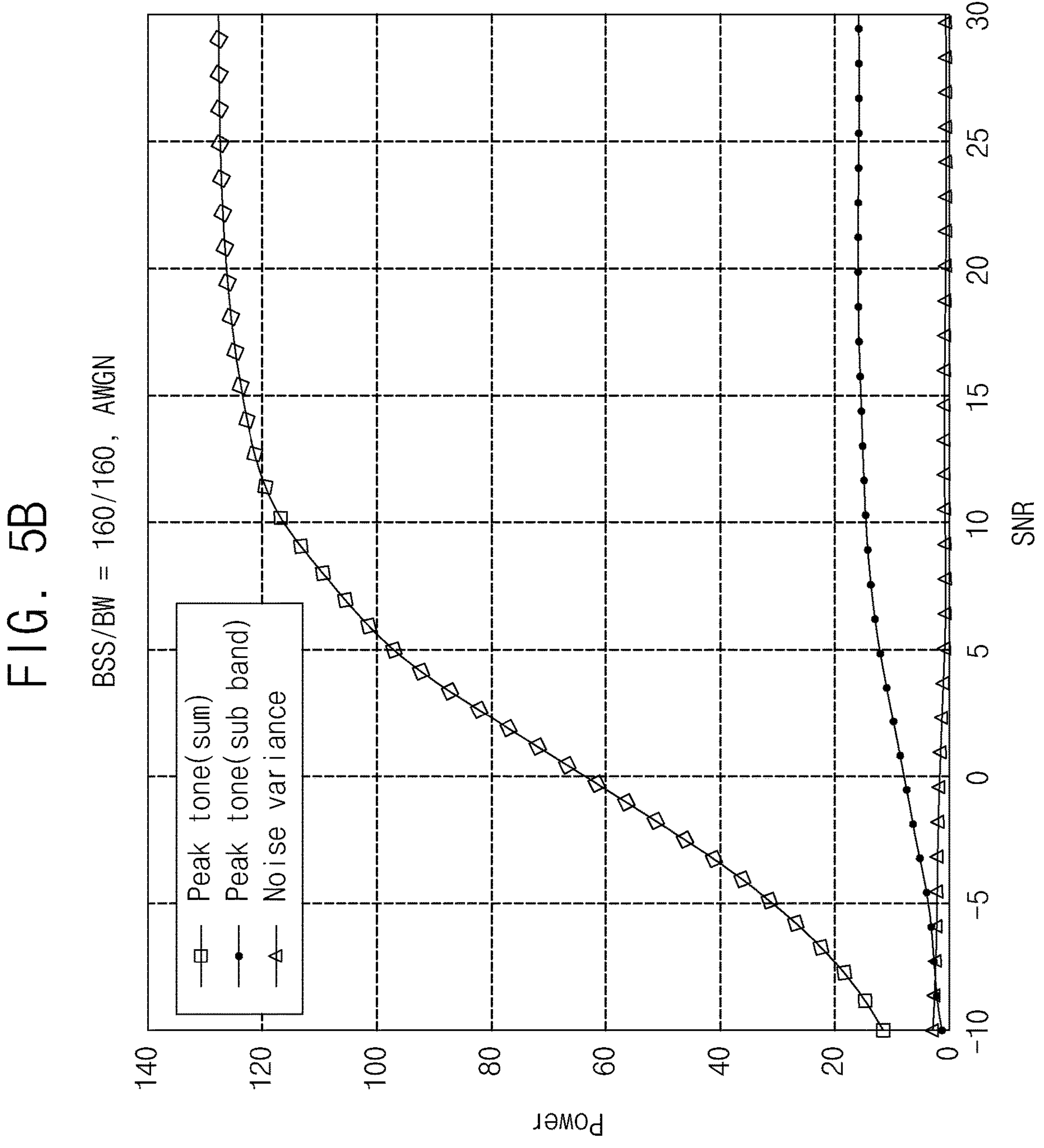
Figure 6:
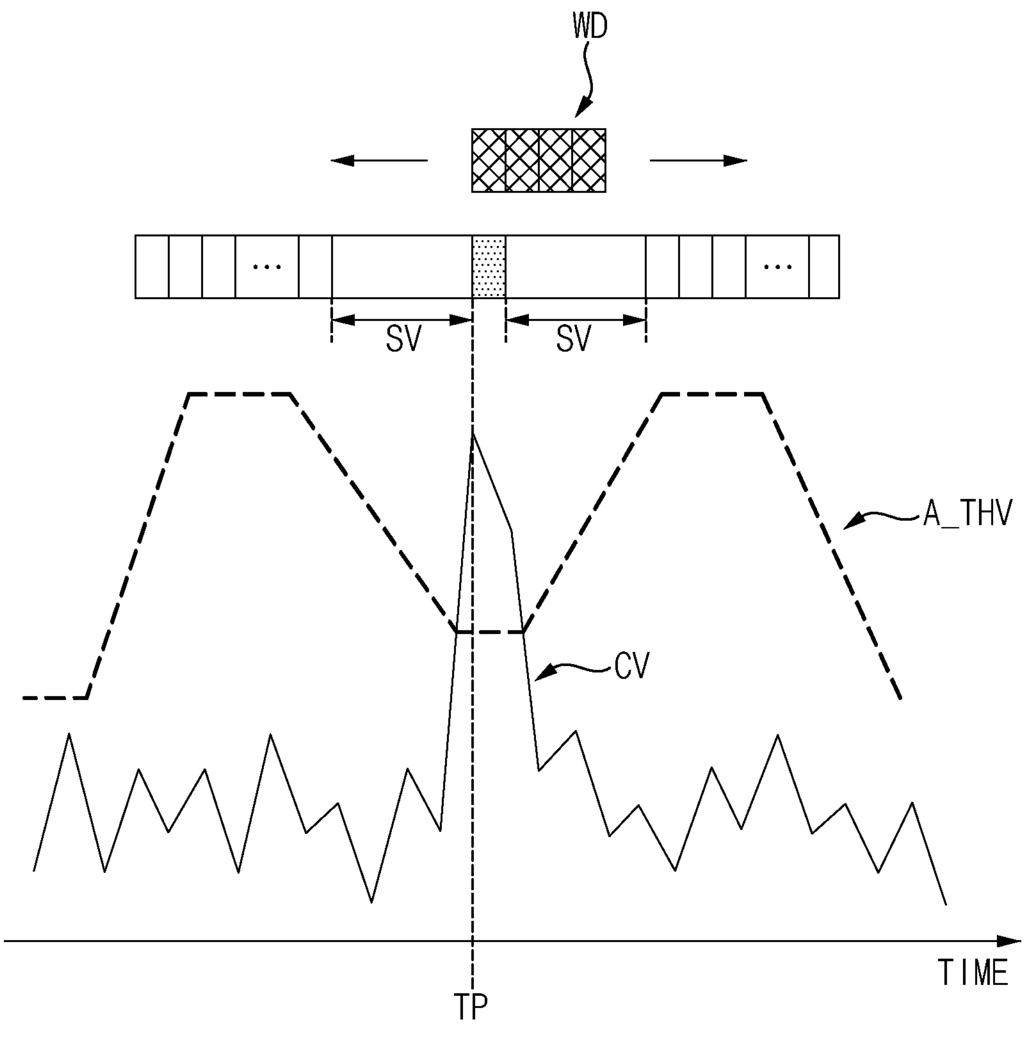

FIG. 4 is a flowchart illustrating an example of calculating an adaptive threshold in FIG. 1. FIGS. 5A, 5B and 6 are diagrams for describing an operation of FIG. 4.

Referring to FIGS. 1, 4, 5A, 5B and 6, unlike a conventional method in which a sub-band is detected using a fixed threshold, the sub-band may be detected according to one or more example embodiments using the adaptive threshold having the variable (or changeable) value depending on the input signal. For example, the adaptive threshold may be calculated by windowing a part of the input signal.

For example, when calculating the adaptive threshold (operation S400), noise power may be measured by performing a windowing operation around a target position of the input signal (operation S410), and the adaptive threshold may be obtained based on the noise power (operation S420). For example, the target position of the input signal may correspond to one of the plurality of sample indices (e.g., the sample indices SAM_IDX in FIG. 3A).

In one or more example embodiments, the adaptive threshold may be derived from a result of cross-correlation function for neighboring time indices. For example, assuming an additive white Gaussian noise (AWGN) wireless channel including only noise variance corresponding to a signal-to-noise ratio (SNR), $|a_{y,b}(0)|$, which is a result of cross-correlation function for a sub-band reference signal for the received signal, and lay, $|a_{y,B}(0)|$, which is a result of combining thereof, may be represented by Equation 16 and Equation 17, respectively.

$$|a_{y,b}(0)| = P_b(0) = \frac{\left(\frac{N_{MF}}{N_B}\right)}{1 + \left(10^{-\left(\frac{SNR}{10}\right)} \cdot \frac{N_{Max}}{N_B}\right)} \quad \text{[Equation 16]}$$

$$|a_{y,B}(0)| = P_B(0) = \frac{N_{MF}}{1 + \left(10^{-\left(\frac{SNR}{10}\right)} \cdot \frac{N_{Max}}{N_B}\right)} \quad \text{[Equation 17]}$$

In addition, $|a_{y,b}(n)|_{n \neq 0}$, which is a result of cross-correlation function for adjacent indices where the peak tone does not exist, may be represented by Equation 18 as a function of noise variance.

$$|a_{y,b}(n)|_{n \neq 0} = \frac{\left(10^{-\left(\frac{SNR}{10}\right)} \cdot \frac{N_{Max}}{N_B}\right)}{1 + \left(10^{-\left(\frac{SNR}{10}\right)} \cdot \frac{N_{Max}}{N_B}\right)} \quad \text{[Equation 18]}$$

FIGS. 5A and 5B illustrate expected results of the matched filtering operation depending on noise variance, e.g., SNR. For example, $|a_{y,B}(0)|$, $|a_{y,b}(0)|$, and $|a_{y,b}(n)|_{n \neq 0}$ based on $N_B$ and $N_{Max}$, which are the number of valid sub-bands actually included in the wideband and the maximum number of sub-bands that can be included in the wideband, respectively, are illustrated depending on noise variance.

In the method of detecting synchronization timing and sub-band and the receiver according to one or more example embodiments, the adaptive threshold may be calculated by the windowing operation on a specific region of a signal using an adjustable parameter. For example, $Q_b(n)$, which is a representative value of $|a_{y,b}(n)|_{n \neq 0}$, may be obtained by calculating an average value within an appropriate range, and $Q_b(n)$ may reflect the noise level of the corresponding time index region. If an arbitrary window size is defined as $L_{win}$, $Q_b(n)$ reflecting the average value of $|a_{y,b}(n)|_{n \neq 0}$ may be calculated and measured from $L_{shift}$, which is an arbitrary non-zero shift value, by Equation 19.

$$Q_b(n) = \frac{1}{L_{win}} \sum_{l=L_{shift}}^{L_{win}+L_{shift}-1} |a_{y,b}(l)| \;\tilde{=}\; E\{|a_{y,b}(n)|_{n \neq 0}\} \quad \text{[Equation 19]}$$

From the above-measured values, $T_b(n)$, which is an optimal adaptive threshold for detecting the peak tone, may be calculated. For example, various applications may be performed based on a correlation between $|a_{y,b}(0)|$ and $|a_{y,b}(n)|_{n \neq 0}$, and for example, the adaptive threshold may be calculated by Equation 20.

$$T_b(n) = \frac{|a_{y,b}(0)| + |a_{y,b}(n)|_{n\neq 0}}{2} = \beta + \gamma \cdot Q_b(n) \quad \text{[Equation 20]}$$

In other words, the noise power obtained in S410 of FIG. 4 and the adaptive threshold obtained in S420 of FIG. 4 may be calculated based on Equation 19 and Equation 20, respectively. In Equation 19 and Equation 20, $Q_b(n)$ denotes the noise power, and $T_b(n)$ denotes the adaptive threshold. In addition, as described above, n denotes a sample index, $L_{win}$ denotes a window size for the windowing operation in S410, $L_{shift}$ denotes a shift value for the windowing operation, $|a_{y,b}(0)|$ and $|a_{y,b}(n)|_{n\neq 0}$ denote cross-correlation function (CCF) values, and β and γ denote constant values. Further, E{·} denotes a function of obtaining an average value, and β and γ may be adjustable by optimization and parameters.

FIG. 6 conceptually illustrates a process of calculating the peak tone and the adaptive threshold used for detecting the sub-band according to one or more example embodiments. After a range in the time domain for an arbitrary target is determined by the matched filtering operation and magnitude comparison, the peak tone $|a_{y,b}(0)|$ may be calculated based on a target range set with respect to the corresponding time domain index. In addition, the noise power $Q_b(n)$ may be measured by performing the windowing operation within a preset range with respect to the target position (e.g., the corresponding time domain index), and the adaptive threshold $T_b(n)$ may be calculated therefrom. In FIG. 6, 'CV' represents CCF values (or results of cross-correlation function), 'A_THV' represents the adaptive threshold, 'TP' represents the target position, 'WD' represents a window for the windowing operation, and 'SV' represents a shift value during the windowing operation. The sizes (or magnitudes) of 'WD' and 'SV' may correspond to $L_{win}$ and $L_{shift}$ in Equation 19, respectively. When a peak value greater than the adaptive threshold is detected among peak values of the CCF values, it may be determined that a corresponding sub-band is detected.

Figures 7, 8A:
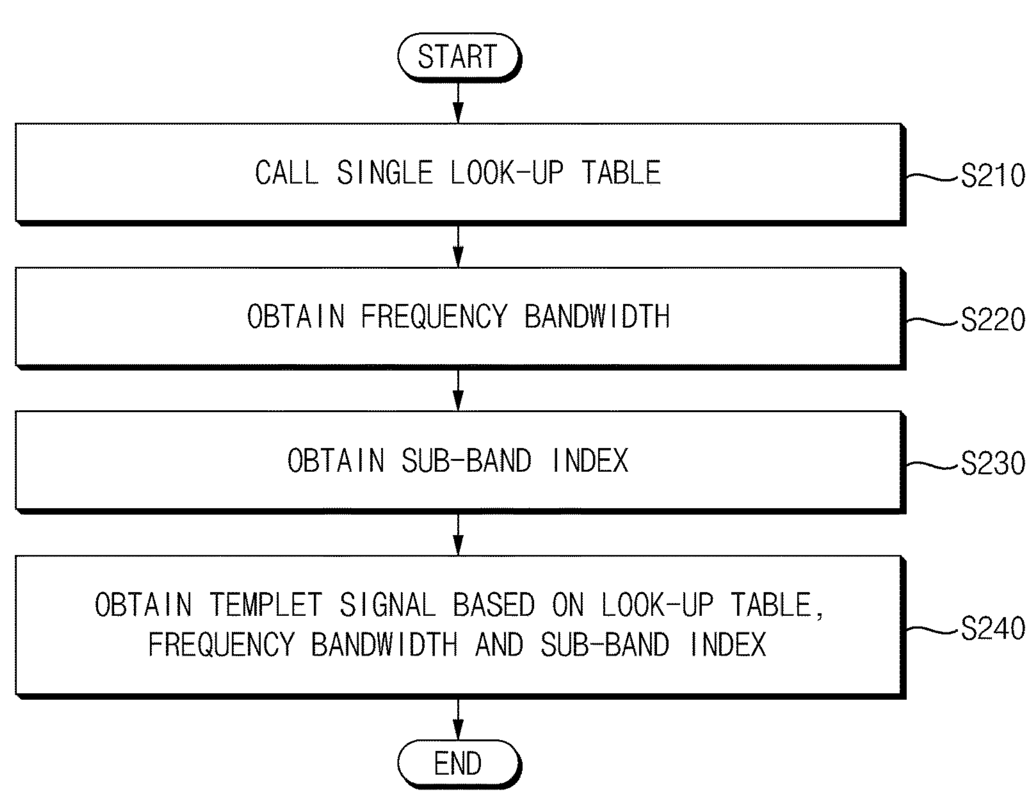

FIG. 7 is a flowchart illustrating an example of generating a template signal in FIG. 1. FIGS. 8A, 8B, 8C and 8D are diagrams for describing an operation of FIG. 7.

Referring to FIGS. 1, 7, 8A, 8B, 8C and 8D, when generating the template signal (operation S200), a pre-stored look-up table corresponding to the reference signal may be called (operation S210), a frequency bandwidth of the input signal may be obtained (operation S220), a sub-band index of the input signal may be obtained (operation S230), and the template signal may be obtained based on the look-up table, the frequency bandwidth and the sub-band index (operation S240). The pre-stored look-up table may be a single look-up table. For example, filter coefficients for the matched filtering operation may correspond to complex numbers, and the look-up table may include only real numbers. For example, the look-up table may be formed or implemented in a ternary scheme such that each of the real numbers included in the look-up table correspond to one of +1, 0 and −1.

The reference signal $x_{N,b}(n)$ used for the matched filtering operation may be defined from a unit training sequence $X_{Nsub}(k)$ in a unit frequency domain, based on the maximum number $N_{Max}$ of sub-bands that can be included in the wideband and a sub-band index b.

Conventionally, reference signals of all combinations applicable to the matched filter operation should be stored in advance, and the size of look-up table corresponding to the reference signals may be calculated by Equation 21.

$$\text{size}_{LUT} = 2 \times N_{sub} \times (N_{Max})^2 \quad \text{[Equation 21]}$$

In the method of detecting synchronization timing and sub-band and the receiver according to one or more example embodiments, the template signal $x_{N,b}(n)$ corresponding to a specific sub-band may be generated from a reference signal R(m,n) in consideration of the bandwidth $N_{Max}$ and the sub-band index b. If the size $N_{sub}$ of a unit sub-band is determined, a width of most widebands may satisfy a relationship of 2N times of $N_{sub}$, and thus an index n may be identified or distinguished depending on odd/even numbers in the time domain. For example, if a training sequence having N samples is defined as Equation 22 and Equation 23 in the time domain, a wideband signal having a bandwidth 2N, which is twice of N, may satisfy Equation 24, Equation 25, Equation 26 and Equation 27.

$$x_{N,b}(2n) = \sum_{k=0}^{Nsub-1} X_{Nsub}(k) \cdot W_N^{2nk} \cdot W_N^{2nb \cdot N_{sub}} \quad \text{[Equation 22]}$$

$$x_{N,b}(2n+1) = \sum_{k=0}^{Nsub-1} X_{Nsub}(k) \cdot W_N^{2nk} \cdot W_N^{2nb \cdot Nsub} \cdot W_N^{(k+b \cdot Nsub)} \quad \text{[Equation 23]}$$

$$x_{2N,b}(4n) = \sum_{k=0}^{Nsub-1} X_{Nsub}(k) \cdot W_N^{2nk} \cdot W_N^{2nb \cdot Nsub} \quad \text{[Equation 24]}$$

$$x_{2N,b}(4n+1) = \sum_{k=0}^{Nsub-1} X_{Nsub}(k) \cdot W_N^{2nk} \cdot W_N^{2nb \cdot Nsub} \cdot W_{2N}^{k+b \cdot Nsub} \quad \text{[Equation 25]}$$

$$x_{2N,b}(4n+2) = \sum_{k=0}^{Nsub-1} X_{Nsub}(k) \cdot W_N^{2nk} \cdot W_N^{2nb \cdot Nsub} \cdot W_N^{(k+b \cdot Nsub)} \quad \text{[Equation 26]}$$

$$x_{2N,b}(4n+3) = \sum_{k=0}^{Nsub-1} X_{Nsub}(k) \cdot W_N^{2nk} \cdot W_N^{2nb \cdot Nsub} \cdot W_N^{3(k+b \cdot Nsub)} \quad \text{[Equation 27]}$$

Based on the above-described Equation 22, Equation 23, Equation 24, Equation 25, Equation 26 and Equation 27, Equation 28 may be established depending on the magnitude of the bandwidth of the signal, and thus a reference signal of a lower band may be inferred from a reference signal of an upper band.

$$x_{N,b}(2n+p) = x_{2N,b}(4n+2p) \quad \text{[Equation 28]}$$

In addition, the reference signal $x_{N,b}(n)$ depending on the sub-band index b may satisfy Equation 29 with an adjacent sub-band.

$$x_{N,b+1}(n) = W_N^{nN_{sub}} \cdot x_{N,b}(n) \quad \text{[Equation 29]}$$

The indexing technique according to one or more example embodiments may be implemented based on the above-described characteristics of the bandwidth and the sub-band index.

FIGS. 8A, 8B, 8C and 8D illustrate a process of obtaining a final template coefficients $x_{N,b}(n)$ applied to the matched filter from a specific reference signal R(m,n). For convenience of description, an example where $N_{Max}$, which is the number of sub-bands of the maximum bandwidth, is eight is illustrated.

FIG. 8A illustrates an example of matched filter coefficients. The matched filter coefficients may include N complex numbers depending on the sub-band index b of each maximum bandwidth. In FIG. 8A, only complex numbers corresponding to 4n, 4n+1, 4n+2 and 4n+3 are illustrated.

FIG. 8B illustrates a configuration of a look-up table corresponding to the reference signal R(m,n) used to obtain matched filter coefficients when $N_{Max}$ is eight. The reference signal R(m,n) may be obtained based on an arbitrary sub-band index b included in the maximum bandwidth, and may be composed of a single real number without distinguishing a real number part and an imaginary number part of a complex number. For example, when b=0, the reference signal R(m,n) may be implemented based on Equation 30, Equation 31, Equation 32 and Equation 33.

$$R(0, n) = IM\{x_{N_{Max},0}(n)\} \quad \text{[Equation 30]}$$

$$R(1, n) = IM\left\{x_{N_{Max},0}(n) \times \exp\left(\frac{-2j\pi}{N_{Max}}\right)\right\} \quad \text{[Equation 31]}$$

$$R(2, n) = RE\{x_{N_{Max},0}(n)\} \quad \text{[Equation 32]}$$

$$R(3, n) = RE\left\{x_{N_{Max},0}(n) \times \exp\left(\frac{-2j\pi}{N_{Max}}\right)\right\} \quad \text{[Equation 33]}$$

In Equation 30, Equation 31, Equation 32 and Equation 33, RE{·} denotes a function of obtaining a real number part, IM{·} denotes a function of obtaining an imaginary number part.

FIG. 8C illustrates an example of a look-up table corresponding to the reference signal R(m,n). For example, the look-up table of FIG. 8C may be obtained by applying Equation 30, Equation 31, Equation 32 and Equation 33 to the matched filter coefficients of FIG. 8A.

Figures 8D, 9:
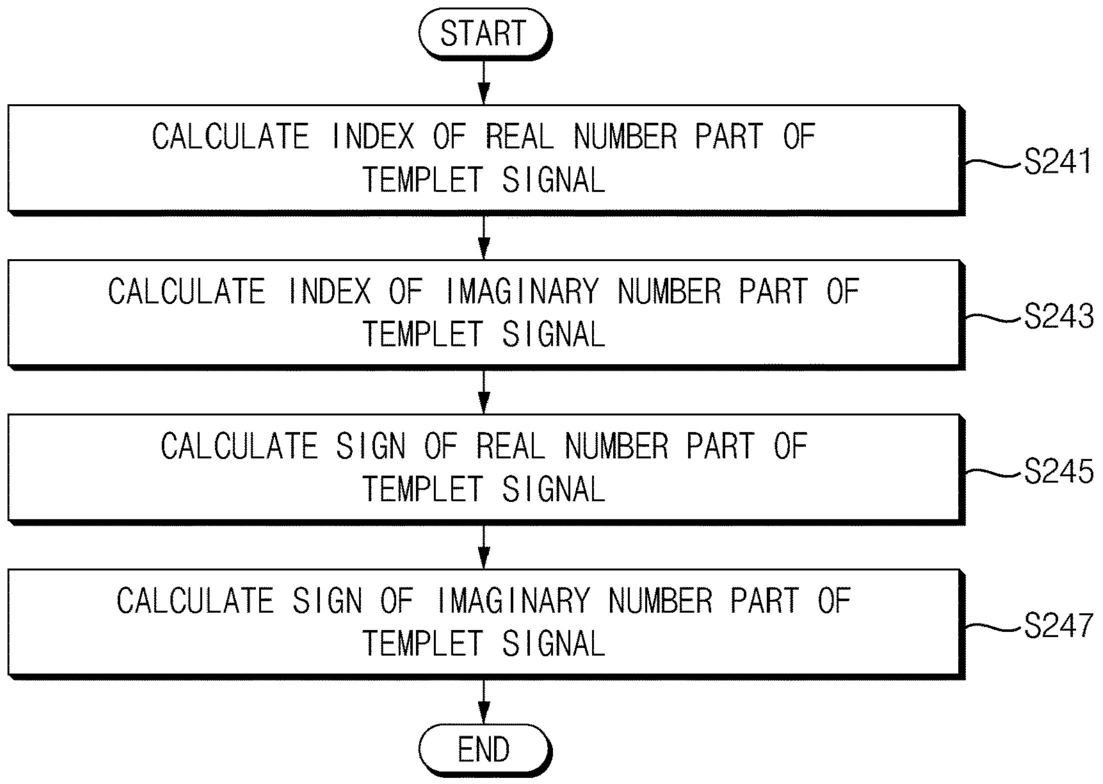

FIG. 8D illustrates an example of a look-up table corresponding to the reference signal R(m,n). For example, the look-up table of FIG. 8D may be obtained by applying the ternary scheme to the look-up table of FIG. 8C. In the ternary scheme, the reference signal R(m,n) may be composed of one of −1, 0 or +1, and the size of look-up table and the computational complexity may be further reduced.

FIG. 9 is a flowchart illustrating an example of obtaining a template signal in FIG. 7.

Referring to FIGS. 7 and 9, when obtaining the template signal (operation S240), an index of a real number part of the template signal may be calculated (operation S241), an index of an imaginary number part of the template signal may be calculated (operation S243), a sign of the real number part of the template signal may be calculated (operation S245), and a sign of the imaginary number part of the template signal may be calculated (operation S247).

For example, the index of each element for the reference signal R(m,n) may be calculated through a process described below. Since the corresponding reference signal is composed of a single real number without distinguishing the real number part and the imaginary number part, the template signal $x_{N,b}(n)$ may be calculated by performing an indexing process for both the real number part and the imaginary number part. If the indices n and b are converted into bitwise operators N[7:0] and B[2:0], respectively, an index $IDX_{RE}$(n,b) of the real number part and an index $IDX_{IM}$(n,b) of the imaginary number part may be calculated based on Equation 34, Equation 35, Equation 36 and Equation 37. In other words, bit operations may be used.

$$I[1] = (N[0] \text{ AND } B[1]) \text{ OR } (\text{NOT}(N[0]) \text{ AND } B[0] \text{ AND } N[1]) \quad \text{[Equation 34]}$$

$$I[0] = N[0] \text{ AND } B[0] \quad \text{[Equation 35]}$$

$$IDX_{RE}(n, b) = 2 \times \text{NOT}(I[1]) + I[0] \quad \text{[Equation 36]}$$

$$IDX_{IM}(n, b) = 2 \times I[1] + I[0] \quad \text{[Equation 37]}$$

In addition, to implement the template signal $x_{N,b}(n)$, it may be necessary to determine the sign of the template signal depending on the indices n and b. A sign $S_{RE}$(n,b) of the real number part and a sign $S_{IM}$(n,b) of the imaginary number part may be calculated based on Equation 38, Equation 39, Equation 40 and Equation 41.

$$U_{RE}(n, b) = \begin{cases} -1 & \text{for } ((n = 2 \text{ OR } n = 4) \text{ AND } B[0]) \\ 1 & \text{for others} \end{cases} \quad \text{[Equation 38]}$$

$$U_{IM}(n, b) = \begin{cases} -1 & \text{for } (N[2] \text{ AND} \sim N[0] \text{ AND } B[0]) \\ 1 & \text{for others} \end{cases} \quad \text{[Equation 39]}$$

$$S_{IM}(n, b) = (1 - 2(((n\%4 \times (b >> 1))\%4) >> 1)) \times U_{IM}\left(\frac{N_{Max}}{N}n, b\right) \quad \text{[Equation 40]}$$

$$S_{RE}(n, b) = (1 - 2((((8 - n)\%4 \times (b >> 1))\%4) >> 1)) \times U_{RE}\left(\frac{N_{Max}}{N}n, b\right) \quad \text{[Equation 41]}$$

Finally, the template signal $x_{N,b}(n)$ may be obtained based on Equation 42 and Equation 43. In this example, the size of the look-up table may be reduced to about 18.7% compared to a conventional method of Equation 21.

$$RE(x_{N,b}(n)) = R\left(IDX_{RE}\left(\frac{N_{Max}}{N}n, b\right), n\right) \times S_{RE}\left(\frac{N_{Max}}{N}n, b\right) \quad \text{[Equation 42]}$$

$$IM(x_{N,b}(n)) = R\left(IDX_{IM}\left(\frac{N_{Max}}{N}n, b\right), n\right) \times S_{IM}\left(\frac{N_{Max}}{N}n, b\right) \quad \text{[Equation 43]}$$

In Equation 42 and Equation 43, $x_{N,b}(n)$ denotes the template signal, n denotes the sample index, RE(·) denotes a function of obtaining the real number part, IM(·) denotes a function of obtaining the imaginary number part, R(m,n) denotes a real number included in the look-up table, $IDX_{RE}$(·) denotes the index of the real number part of the template signal, $IDX_{IM}$(·) denotes the index of the imaginary number part of the template signal, $S_{RE}$(·) denotes the sign of the real number part of the template signal, SIM(·) denotes the sign of the imaginary number part of the template signal, $N_{Max}$ denotes the maximum number of sub-bands included in the wideband, N denotes the number of samples, and b denotes the sub-band index of the input signal.

Figure 10:
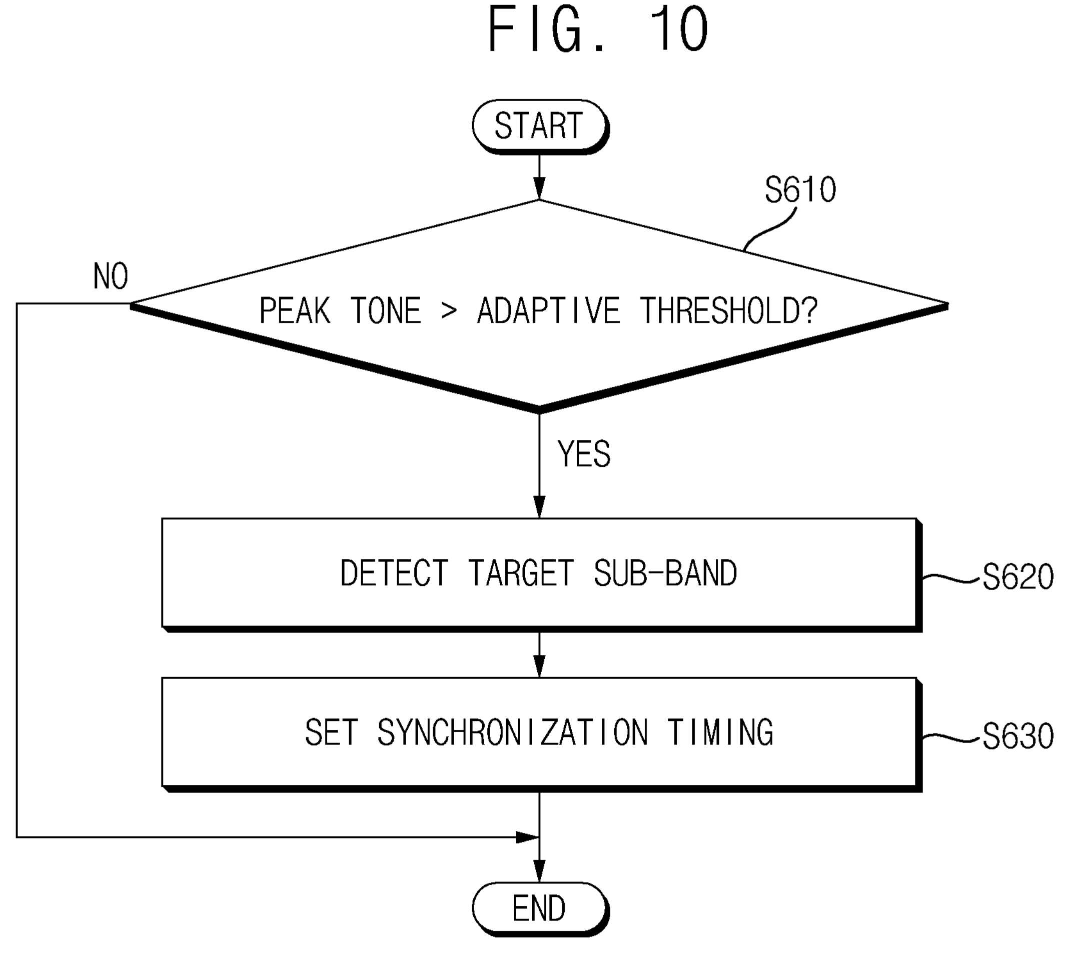
FIG. 10 is a flowchart illustrating an example of determining whether an input signal corresponds to a target sub-band and a synchronization timing for an input signal in FIG. 1.

FIG. 10 is a flowchart illustrating an example of determining whether an input signal corresponds to a target sub-band and a synchronization timing for an input signal in FIG. 1.

Referring to FIGS. 1 and 10, when determining whether the input signal corresponds to the target sub-band and the synchronization timing for the input signal (operation S600), the peak tone and the adaptive threshold may be compared with each other (operation S610).

When the peak tone is greater than the adaptive threshold (operation S610: YES), the target sub-band may be detected (operation S620). For example, it may be determined that the input signal corresponds to the target sub-band. Thereafter, the synchronization timing for the input signal may be set based on the target sub-band (operation S630). For example, a timing corresponding to a current sample index may be set as the synchronization timing.

When the peak tone is less than or equal to the adaptive threshold (operation S610: NO), it may be determined that the input signal does not correspond to the target sub-band. In this example, the process may be terminated or an operation for detecting another sub-band may be additionally performed.

FIGS. 11A, 11B, 12A and 12B are diagrams for describing an effect of a method of detecting synchronization timing and sub-band according to one or more example embodiments.

Referring to FIGS. 11A, 11B, 12A and 12B, the adaptive threshold $T_b(n)$ varying depending on the time index may be calculated by performing the matched filtering operation on the received signal, and the presence or absence of the corresponding sub-band may be determined by comparing the peak tone $P_b(0)$ associated with the result of the matched filtering operation with the adaptive threshold $T_b(n)$, within the valid range.

Figure 11A:
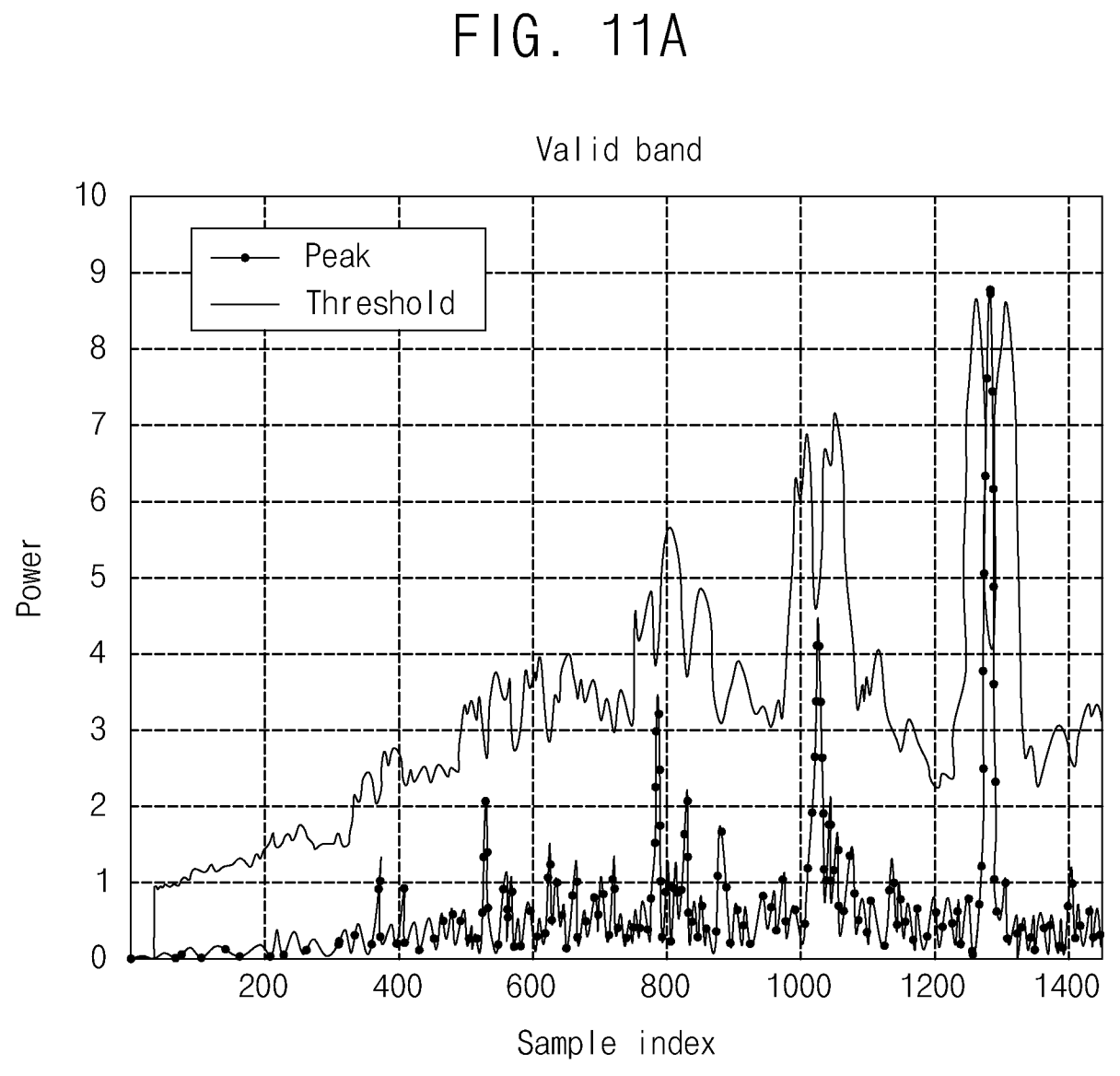
Figure 11B:
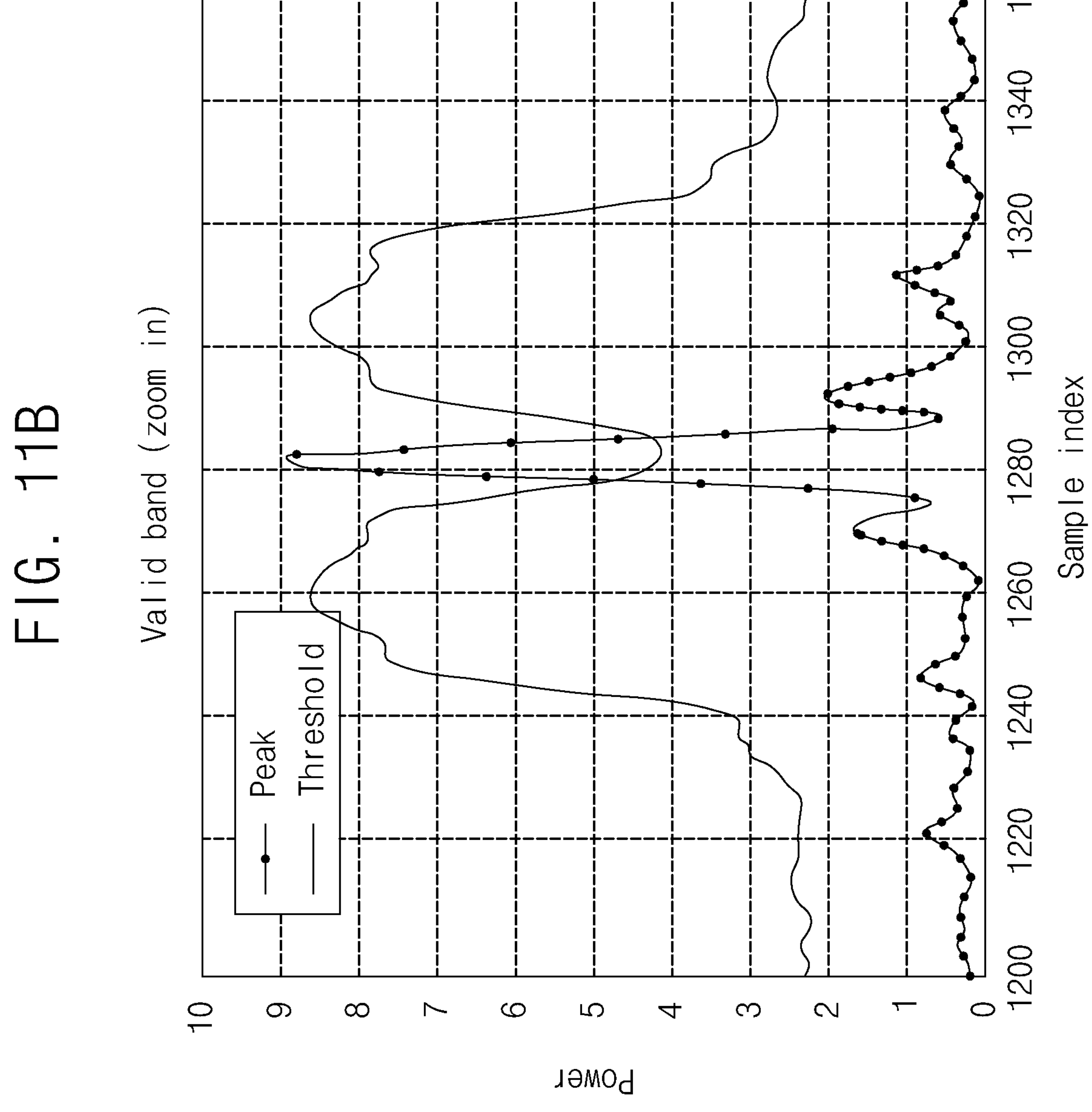
Figure 12A:
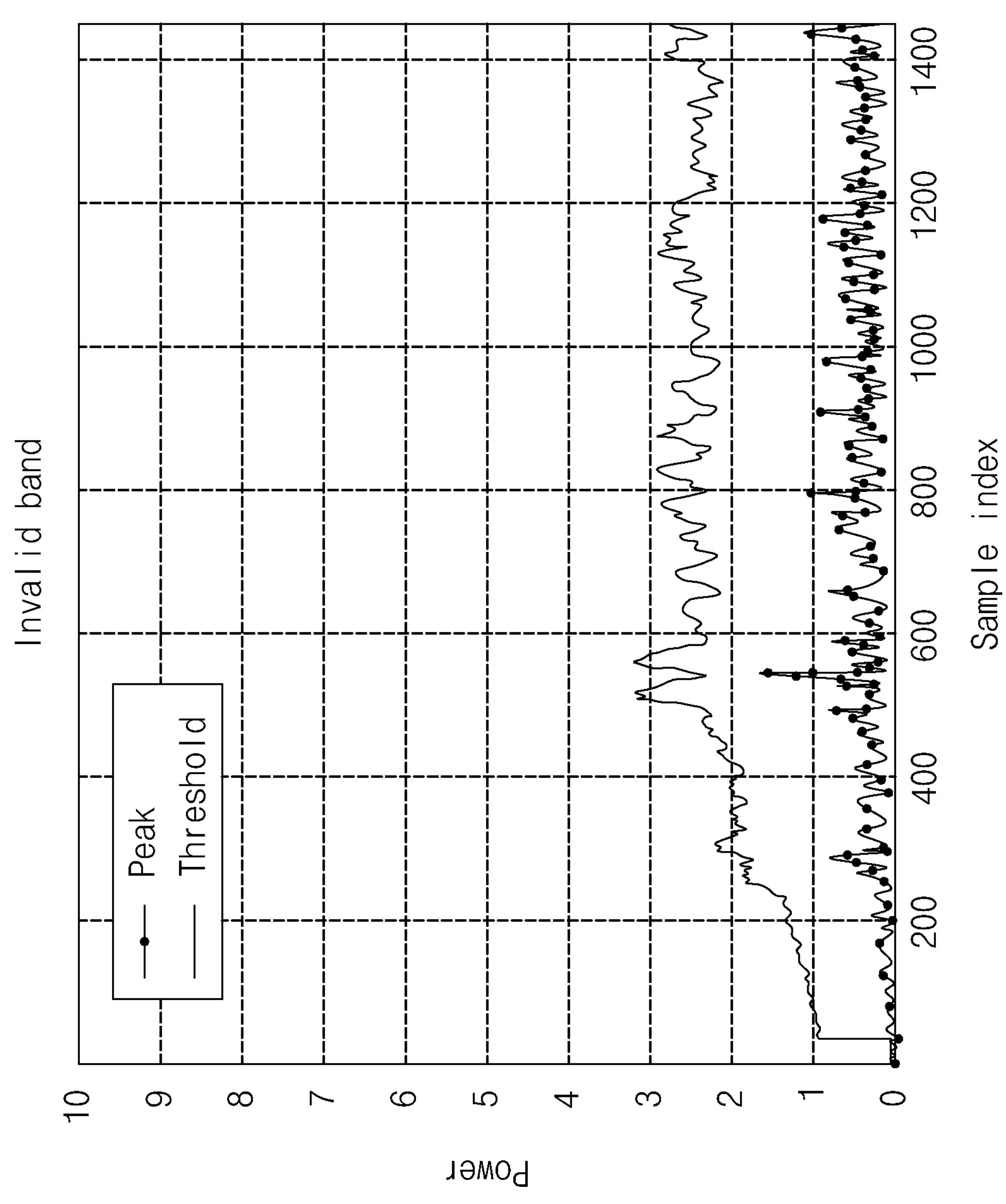
Figure 12B:
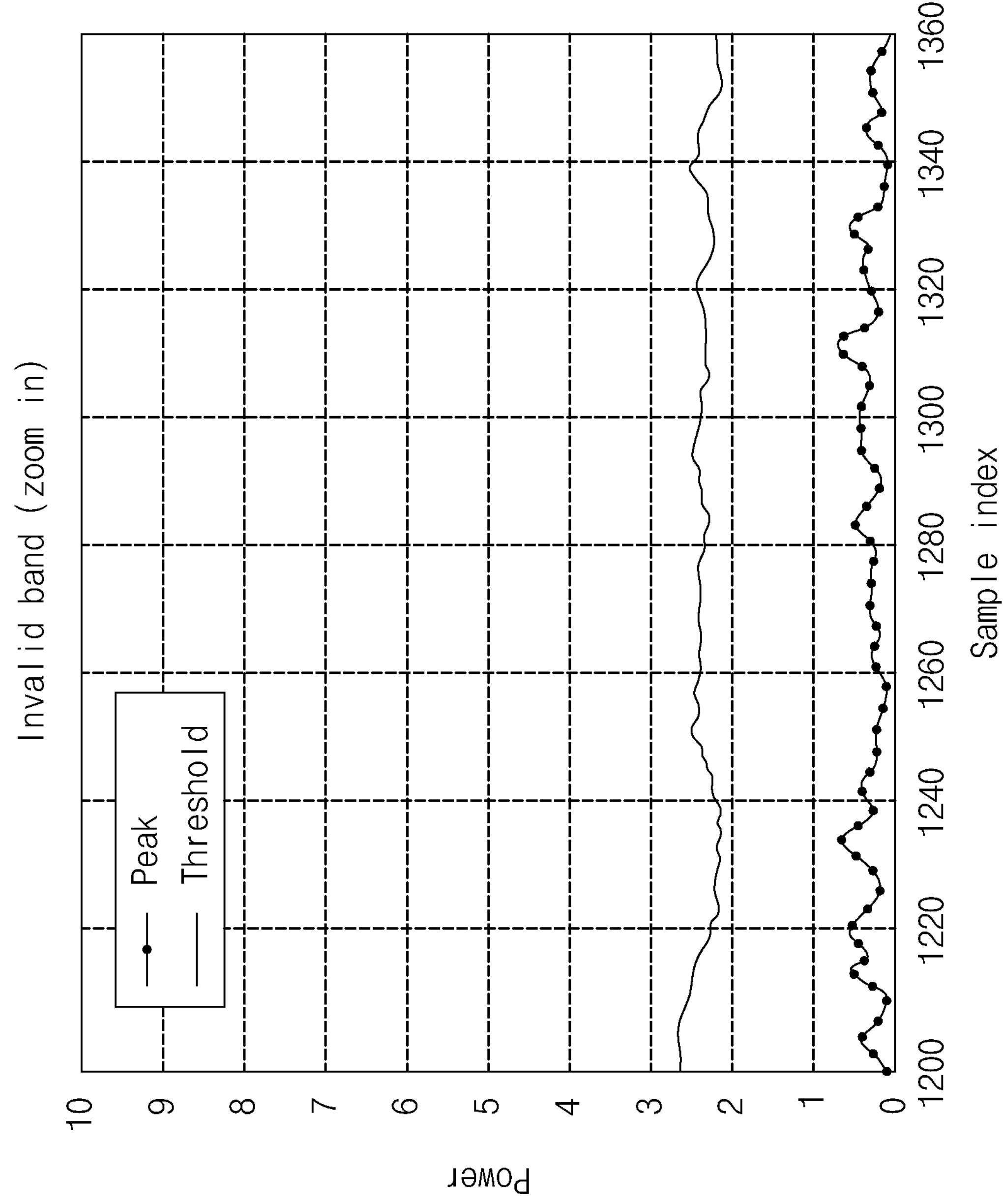

FIGS. 11A and 11B illustrate an example where the target sub-band is detected, and FIGS. 12A and 12B illustrate an example where the target sub-band is not detected. FIGS. 11B and 12B are enlarged views of portions of FIGS. 11A and 12A, respectively. As illustrated in FIGS. 11A and 11B, in a valid sub-band, $P_b(0)$ may exceed $T_b(n)$ in a specific time domain. In contrast, as illustrated in FIGS. 12A and 12B, in an invalid sub-band, there may be no $P_b(0)$ exceeding $T_b(n)$.

Figure 13:
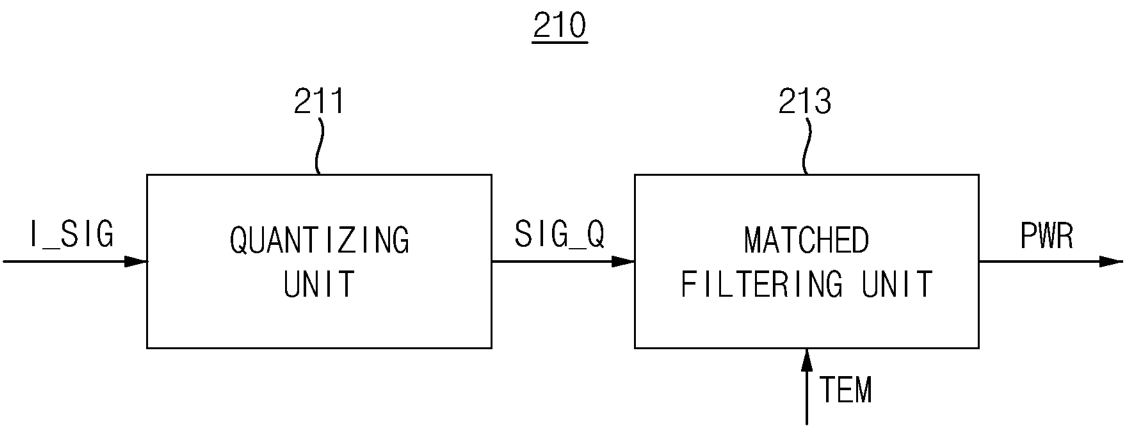
FIG. 13 is a block diagram illustrating an example of a first calculator included in a receiver of FIG. 2.

FIG. 13 is a block diagram illustrating an example of a first calculator included in a receiver of FIG. 2.

Referring to FIG. 13, the first calculator 210 may include a quantizing unit 211 and a matched filtering unit 213.

The quantizing unit 211 may receive the input signal I_SIG, and may perform a quantization operation on the input signal I_SIG. The quantization operation to a certain level may be performed to reduce the computational complexity.

The matched filtering unit 213 may perform the matched filtering operation on a quantized input signal SIG_Q based on the template signal TEM, and may generate the power PWR of the input signal I_SIG as the result of the matched filtering operation.

FIG. 14 is a block diagram illustrating an example of a template generator included in a receiver of FIG. 2.

Referring to FIG. 14, the template generator 220 may include a storage unit 221, a sub-band selecting unit 223 and a template obtaining unit 225.

The storage unit 221 may store the single look-up table REF_LUT corresponding to the single reference signal, and may output the look-up table REF_LUT based on the sample index SAM_IDX and a frequency bandwidth BW. For example, the frequency bandwidth BW may be obtained by the input signal I_SIG.

The sub-band selecting unit 223 may obtain a sub-band index SB_IDX of the input signal I_SIG based on the sample index SAM_IDX and the frequency bandwidth BW.

The template obtaining unit 225 may obtain the template signal TEM based on the look-up table REF_LUT, the frequency bandwidth BW and the sub-band index SB_IDX.

The template obtaining unit 225 may include an index calculating unit 225*a*, a sign calculating unit 225*b* and a template calculating unit 225*c*. The index calculating unit 225*a* may calculate an index IDX_RE of a real number part of the template signal TEM and an index IDX_IM of an imaginary number part of the template signal TEM based on the look-up table REF_LUT, the frequency bandwidth BW and the sub-band index SB_IDX. The sign calculating unit 225*b* may calculate a sign S_RE of the real number part of the template signal TEM and a sign S_IM of the imaginary number part of the template signal TEM based on the look-up table REF_LUT, the frequency bandwidth BW and the sub-band index SB_IDX. The template calculating unit 225*c* may calculate the template signal TEM based on the index IDX_RE of the real number part, the index IDX_IM of the imaginary number part, the sign S_RE of the real number part and the sign S_IM of the imaginary number part.

The template signal TEM used for the matched filtering operation may be determined depending on the bandwidth BW and the sub-band index SB_IDX. For example, both the time index processing and the sub-band index processing may be performed. For example, the single lookup table REF_LUT including four real numbers assigned in a predetermined order m for each time index n may be utilized.

Figure 15:
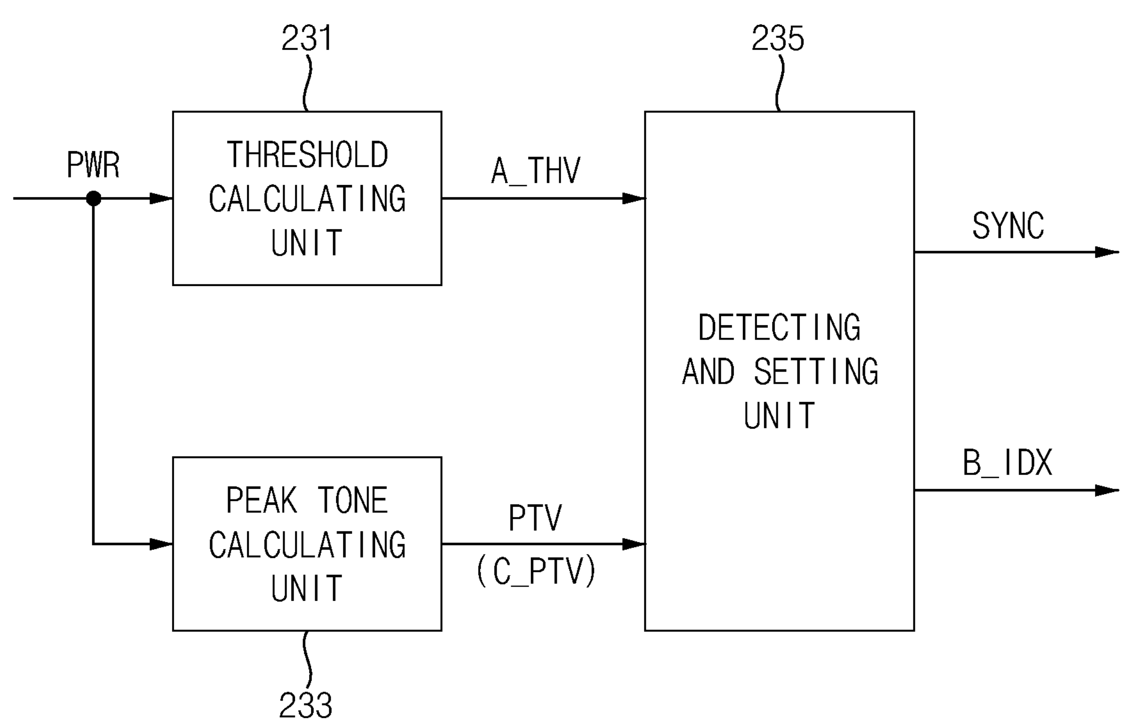
FIG. 15 is a block diagram illustrating an example of a second calculator included in a receiver of FIG. 2.

FIG. 15 is a block diagram illustrating an example of a second calculator included in a receiver of FIG. 2.

Referring to FIG. 15, the second calculator 230 may include a threshold calculating unit 231, a peak tone calculating unit 233 and a detecting and setting unit 235.

The threshold calculating unit 231 may calculate the adaptive threshold A_THV based on the power PWR that is the result of the matched filtering operation.

The peak tone calculating unit 233 may calculate the peak tone PTV based on the power PWR that is the result of the matched filtering operation. In one or more example embodiments, the peak tone calculating unit 233 may further calculate a combined peak tone C_PTV by combining a plurality of peak tones.

The detecting and setting unit 235 may determine whether the input signal I_SIG corresponds to the target sub-band based on the adaptive threshold A_THV and the peak tone PTV, and may determine the synchronization timing for the input signal I_SIG based on the adaptive threshold A_THV and the peak tone PTV. When the input signal I_SIG corresponds to the target sub-band, the detecting and setting unit 235 may generate the sub-band index signal B_IDX representing the target sub-band and the synchronization signal SYNC representing the synchronization timing that is set based on the target sub-band.

The result of the matched filtering operation may be converted into the adaptive threshold A_THV for each specific index. In addition, the peak tone PTV may be obtained by processing the result of the matched filtering operation in consideration of the wireless channel environment. Moreover, the valid (or effective) range for detecting the synchronization timing and the sub-band may be set together from the combined results of the matched filtering operation for the accuracy of sub-band detection.

In one or more example embodiments, at least a part of the first calculator 210, the template generator 220 and the second calculator 230 may be implemented as hardware. For example, at least a part of the first calculator 210, the template generator 220 and the second calculator 230 may be included in a computer-based electronic system. In other example embodiments, at least a part of the first calculator 210, the template generator 220 and the second calculator

230 may be implemented as instruction codes or program routines (e.g., a software program). For example, the instruction codes or the program routines may be executed by a computer-based electronic system, and may be stored in any storage device located inside or outside the computer-based electronic system.

Figure 16:
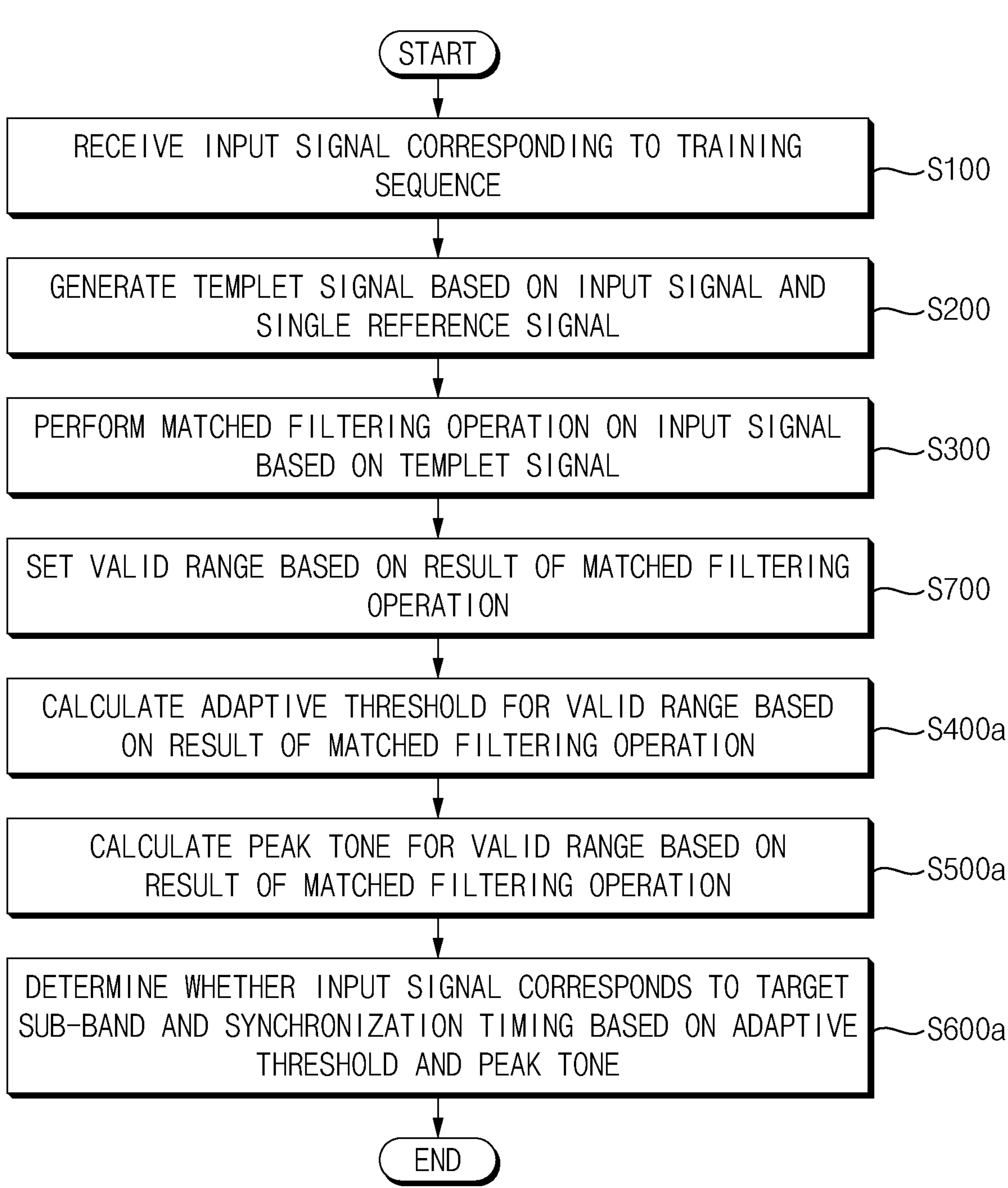
FIGS. 16 and 17 are flowcharts illustrating a method of detecting synchronization timing and sub-band according to one or more example embodiments.
Figure 17:
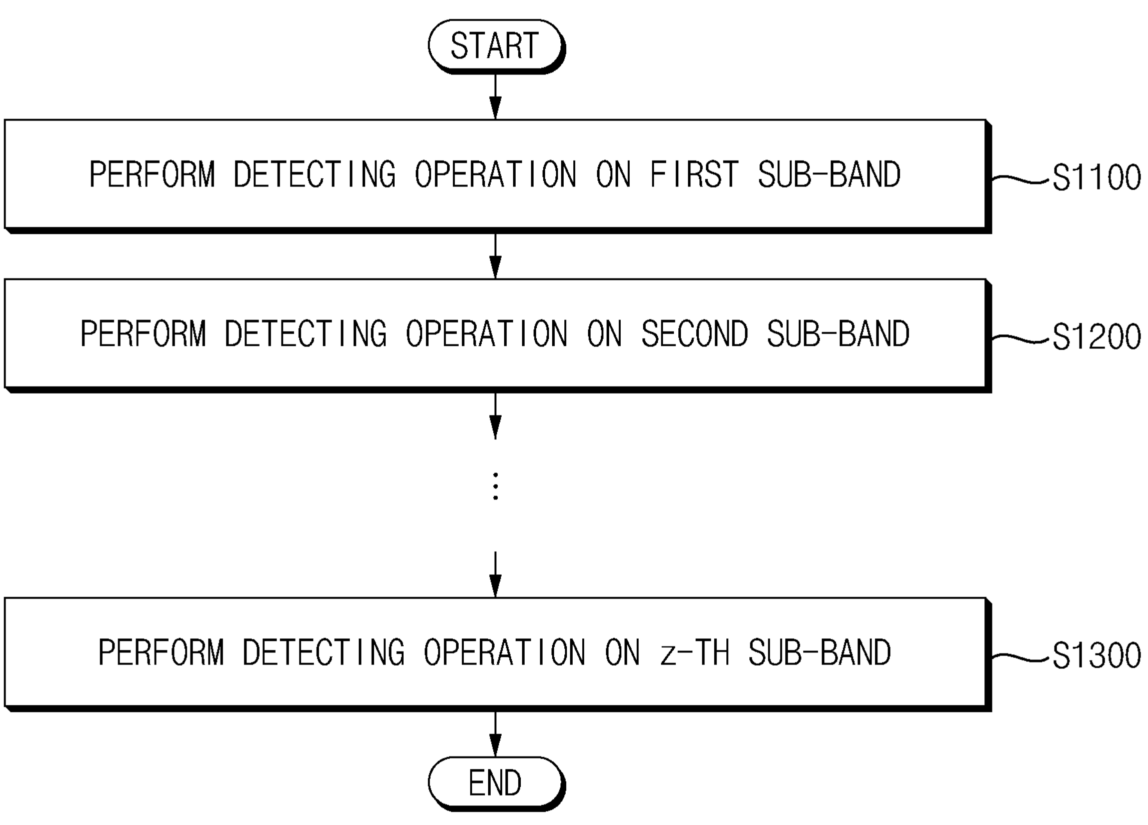

FIGS. 16 and 17 are flowcharts illustrating a method of detecting synchronization timing and sub-band according to one or more example embodiments. The descriptions repeated with FIG. 1 will be omitted.

Referring to FIG. 16, in a method of detecting synchronization timing and sub-band according to one or more example embodiments, operations S100, S200 and S300 may be substantially the same as those described with reference to FIG. 1.

A valid (or effective) range may be set based on the result of matched filtering operation (operation S700). For example, the valid range may be set based on the combined peak tone. Operations S400*a*, S500*a* and S600*a* performed after S700 may be substantially the same as operations S400, S500 and S600 in FIG. 1, except that S400*a*, S500*a* and S600*a* are performed only on the valid range.

Referring to FIG. 17, in a method of detecting synchronization timing and sub-band according to one or more example embodiments, a detecting operation may be performed on a first sub-band (e.g., the sub-band SB1 in FIG. 3B) (operation S1100), a detecting operation may be performed on a second sub-band (e.g., the sub-band SB2 in FIG. 3B) (operation S1200), and a detecting operation may be performed on a z-th sub-band (e.g., the sub-band SBz in FIG. 3B) may be performed (operation S1300), where z is a natural number greater than or equal to two. Each of operations S1100, S1200 and S1300 may be implemented as described with reference to FIG. 1.

In one or more example embodiments, a first template signal corresponding to the first sub-band SB1 may be generated in S1100, a second template signal corresponding to the second sub-band SB2 may be generated in S1200, and a z-th template signal corresponding to the z-th sub-band SBz may be generated in S1300. In this example, all of the first to z-th template signals may be generated based on the same reference signal (e.g., the same look-up table).

In one or more example embodiments, when the input signal corresponds to two or more sub-bands among the plurality of sub-bands, the synchronization timing for the input signal may be determined based on all of the two or more sub-bands.

FIGS. 18A, 18B, 19A and 19B are diagrams for describing an effect of a method of detecting synchronization timing and sub-band according to one or more example embodiments.

Referring to FIGS. 18A, 18B, 19A and 19B, performance of an existing scheme (or conventional method) using the band split filtering scheme and performance of a proposed scheme (or method) according to one or more example embodiments are compared with each other.

Figure 18A:
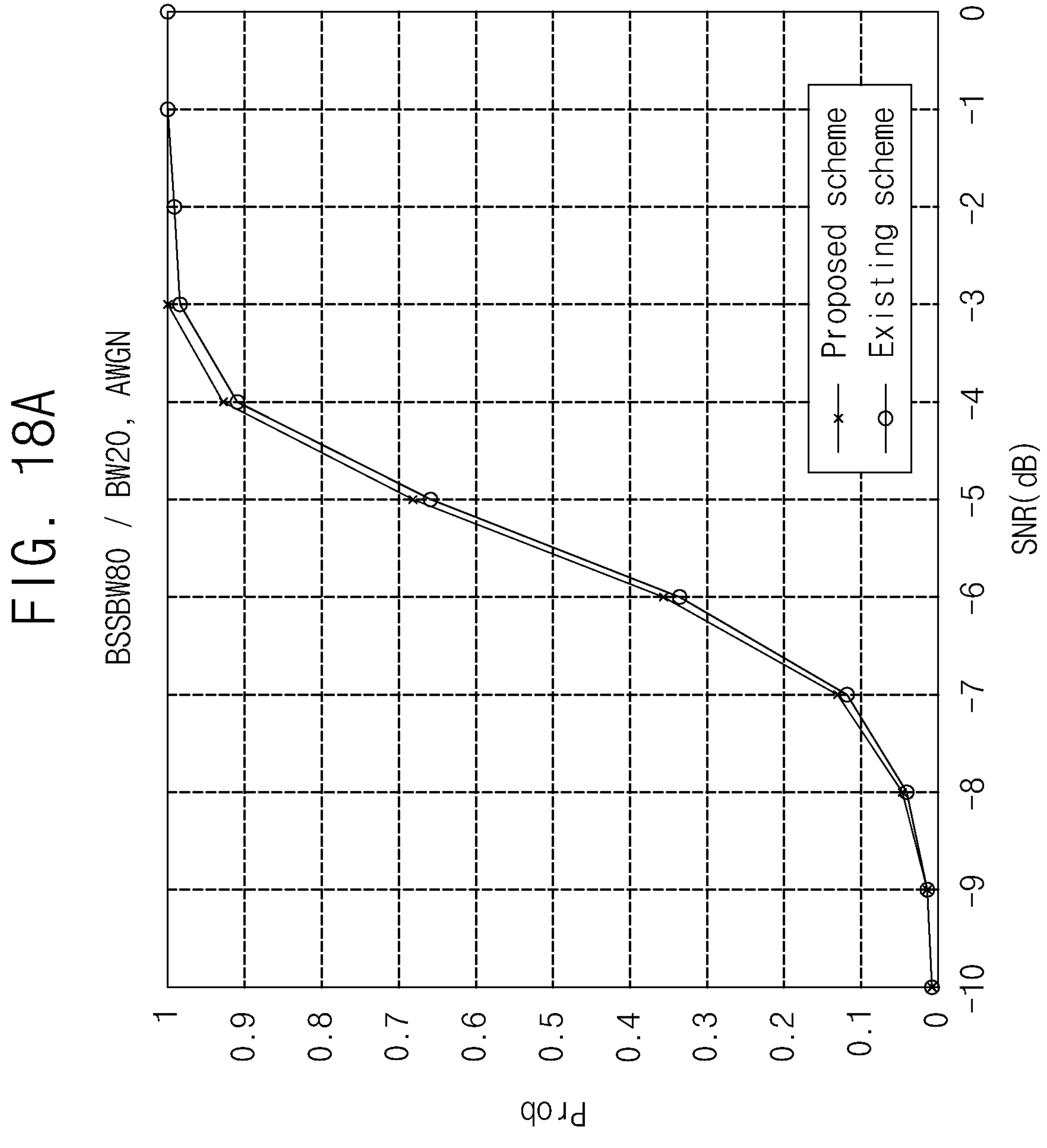
FIGS. 18A, 18B, 19A and 19B are diagrams for describing an effect of a method of detecting synchronization timing and sub-band according to one or more example embodiments.
Figure 18B:
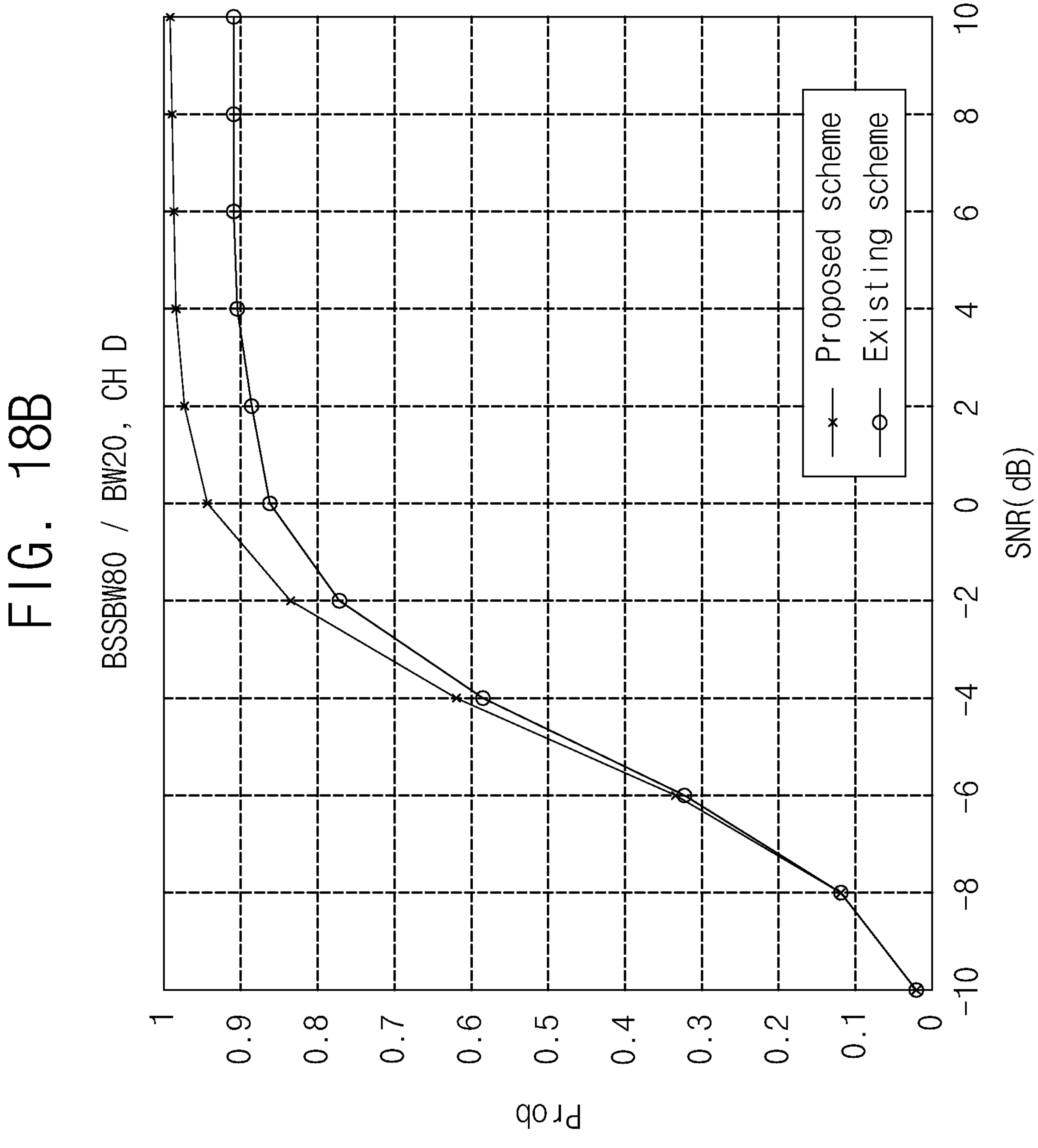

In FIGS. 18A and 18B, the accuracy of detecting the synchronization timing depending on the SNR is illustrated for each of the AWGN channel and the fading channel. For fair comparison, a case of detecting failure in a first training sequence of the existing scheme is excluded, and only the detection accuracy in the same second training sequence is illustrated. It can be seen that the proposed scheme has improved accuracy of detecting the synchronization timing compared to the existing scheme.

Figure 19A:
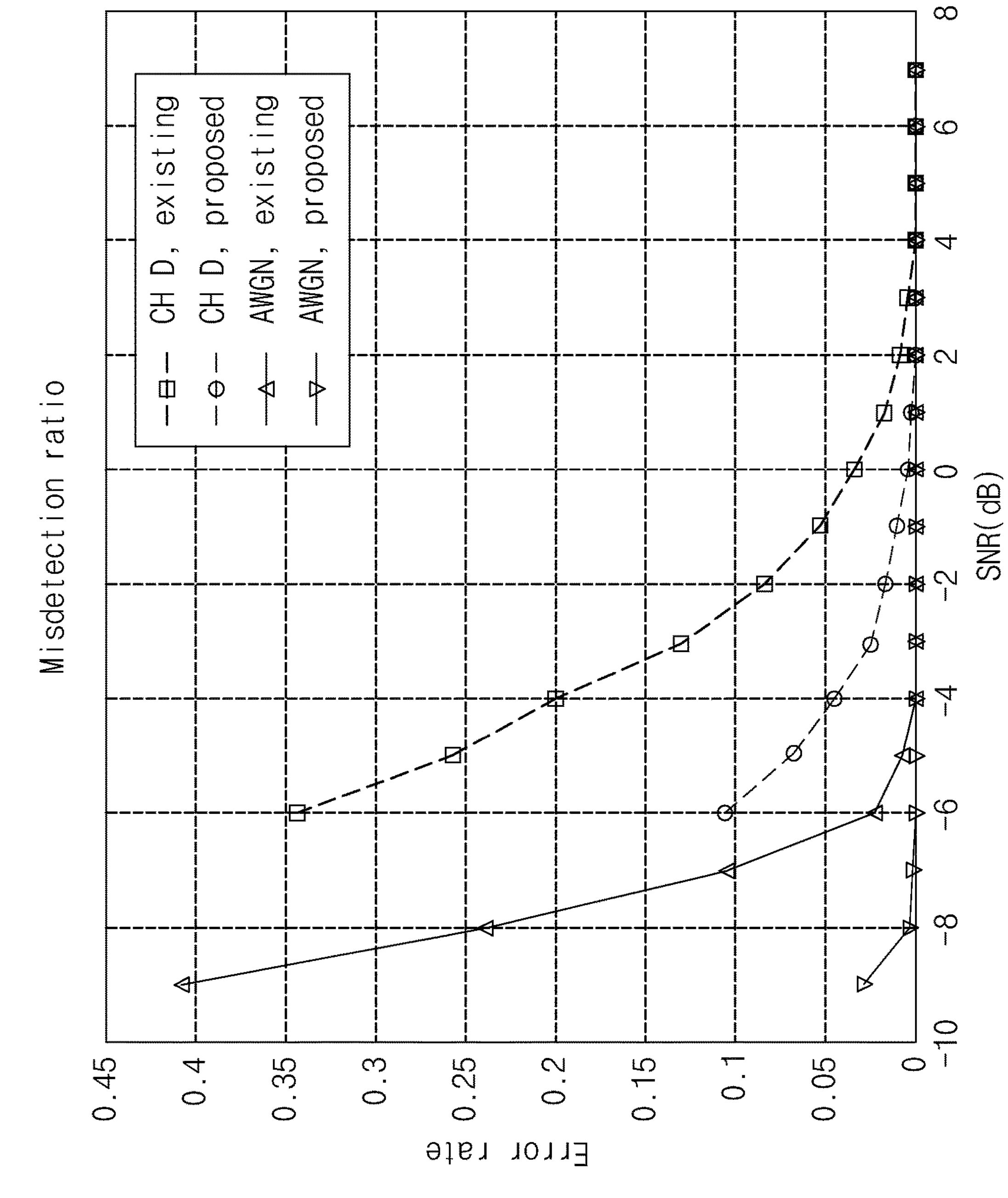
Figure 19B:
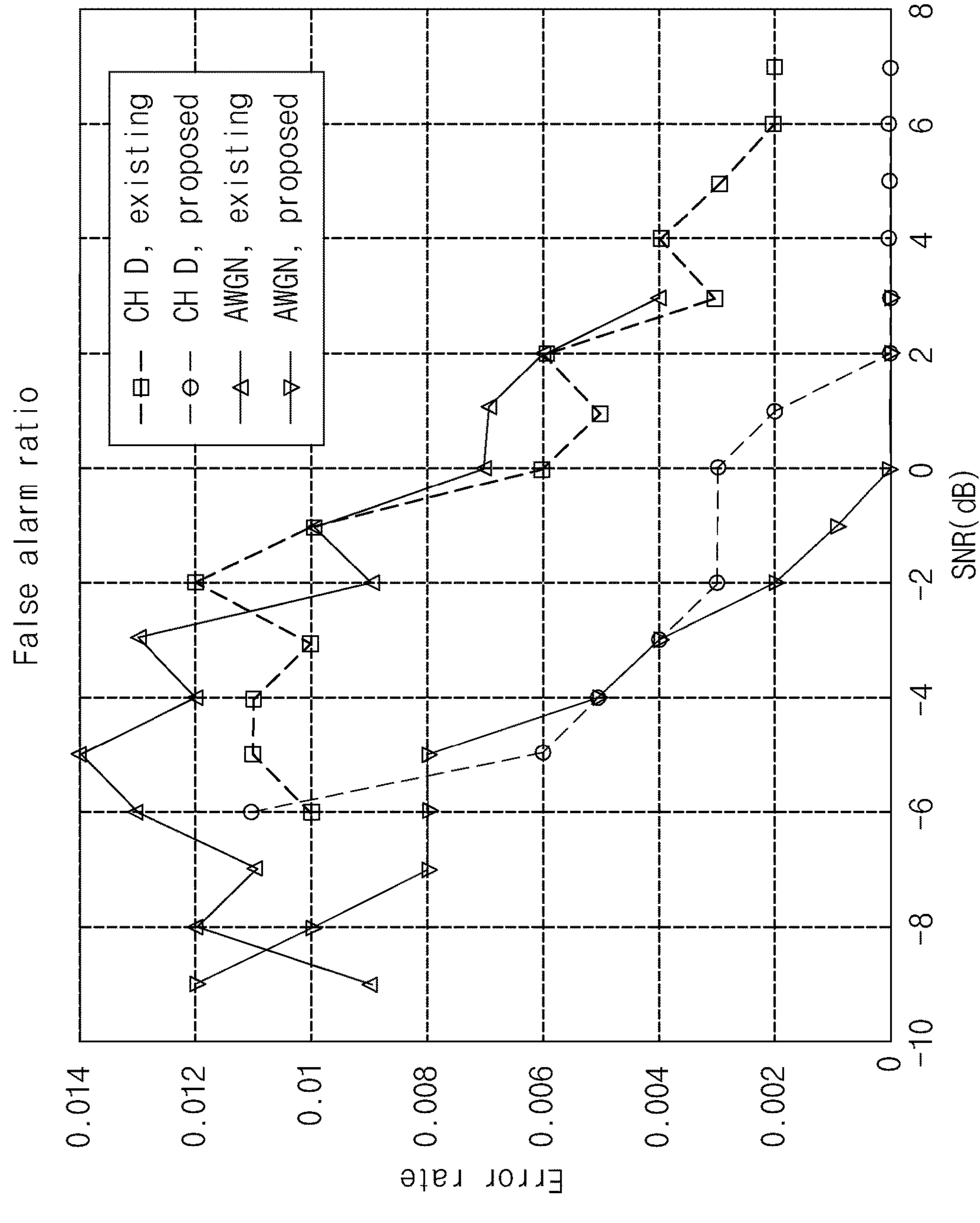

In FIGS. 19A and 19B, the misdetection ratio and the false alarm ratio are illustrated for each of the AWGN channel and the fading channel, and the accuracy of detecting the sub-band depending on the SNR is illustrated. For fair comparison, a training sequence having the same length is used. It can be seen that the proposed scheme has improved accuracy of detecting the sub-band compared to the existing scheme.

The method of detecting synchronization timing and sub-band and the receiver according to one or more example embodiments may be configured as follows: 1) the wide-band-based matched filtering for the sub-band detection; 2) the indexing technique for the template signal extension and construction; 3) the calculation of the peak tone (e.g., by processing the result of the matched filtering operation) in consideration of the wireless channel environment; 4) the calculation of the adaptive threshold in consideration of the wireless channel environment; 5) setting the timing synchronization and the valid sub-band range using the peak tone and/or combined peak tone; and 6) the detection of the sub-band by comparing the peak tone with the adaptive threshold. The wideband-based matched filtering with less complexity may be implemented based on the template signal extension and construction using the sub-band indexing, and thus the delay and distortion may be reduced compared to the conventional band split filtering scheme. In addition, the peak tone and the adaptive threshold may be calculated considering the wireless channel environment, the peak detection may be performed using the variable values, and thus the detection of the synchronization timing and the sub-band optimized for the wireless channel environment may be performed.

As will be appreciated by those skilled in the art, example embodiments may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 20:
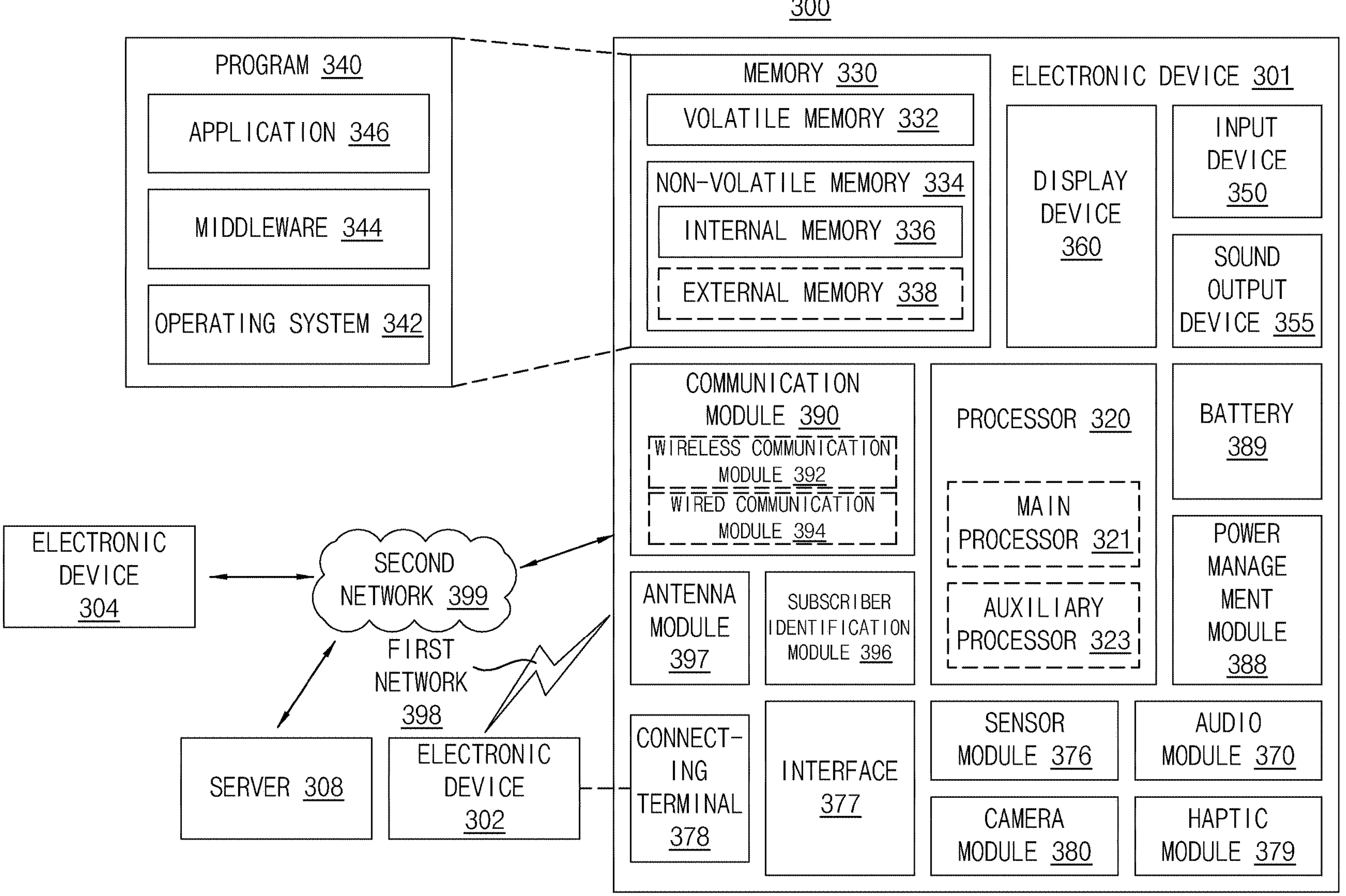
FIG. 20 is a block diagram illustrating an electronic device in a network environment according to one or more example embodiments.

FIG. 20 is a block diagram illustrating an electronic device in a network environment according to one or more example embodiments.

Referring to FIG. 20, an electronic device 301 in a network environment 300 may communicate with an electronic device 302 via a first network 398 (e.g., a short-range wireless communication network), or an electronic device 304 or a server 308 via a second network 399 (e.g., a long-range wireless communication network). In one or more example embodiments, the electronic device 301 may communicate with the electronic device 304 via the server 308. In one or more example embodiments, the electronic device 301 may include a processor 320, a memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, and/or an antenna module 397.

The processor 320 may execute, for example, software (e.g., a program 340) to control at least one other component (e.g., a hardware or software component) of the electronic device 301 coupled with the processor 320, and may perform various data processing or computation. In one or more example embodiments, the processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321.

The memory 330 may store various data used by at least one component (e.g., the processor 320 or the sensor module 376) of the electronic device 301. The various data may include, for example, software (e.g., the program 340) and input data or output data for a command related thereto. The memory 330 may include a volatile memory 332 or a nonvolatile memory 334.

The program 340 may be stored in the memory 330 as software, and may include, for example, an operating system (OS) 342, middleware 344, and/or an application 346.

The input device 350 may receive a command or data to be used by another component (e.g., the processor 320) of the electronic device 301, from the outside (e.g., a user) of the electronic device 301. The sound output device 355 may output sound signals to the outside of the electronic device 301. The display device 360 may visually provide information to the outside (e.g., to a user) of the electronic device 301.

The audio module 370 may convert a sound into an electrical signal and vice versa. The sensor module 376 may detect an operational state (e.g., power or temperature) of the electronic device 301 or an environmental state (e.g., a state of a user) external to the electronic device 301, and then generate an electrical signal or data value corresponding to the detected state. The interface 377 may support one or more specified protocols to be used to couple the electronic device 301 with the external electronic device (e.g., the electronic device 302) directly (e.g., wired) or wirelessly.

A connecting terminal 378 may include a connector via which the electronic device 301 may be physically connected with the external electronic device (e.g., the electronic device 302). The haptic module 379 may convert an electrical signal into a mechanical stimulus (e.g., a vibration or a movement) or electrical stimulus which may be recognized by a user via his tactile sensation or kinesthetic sensation. The camera module 380 may capture a still image or moving images.

The power management module 388 may manage power supplied to other components of the electronic device 301. In one or more example embodiments, the power management module 388 may be implemented as at least part of, for example, a power management integrated circuit (PMIC). The battery 389 may supply power to at least one component of the electronic device 301.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. In one or more example embodiments, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module).

In one or more example embodiments, the wireless communication module 392 included in the communication module 390 may include the transmitter and the receiver included in the wireless communication system according to example embodiments, and may perform the method of detecting synchronization timing and sub-band according to example embodiments. For example, each of the wireless communication module 392 included in the electronic device 301 and a wireless communication module included in the electronic device 304 may include the transmitter 100 and the receiver 200 in FIG. 2, and the second network 399 formed between the electronic devices 301 and 304 may correspond to the channel between the transmitter 100 and the receiver 200 in FIG. 2. The receiver 200 included in the electronic device 301 may communicate with the transmitter 100 included in the electronic device 304, and may perform the method of detecting synchronization timing and sub-band according to one or more example embodiments at the initial operation time. Similarly, the receiver 200 included in the electronic device 304 may communicate with the transmitter 100 included in the electronic device 301, and may perform the method of detecting synchronization timing and sub-band according to one or more example embodiments at the initial operation time.

The antenna module 397 may transmit or receive a signal or power to or from the outside (e.g., the external electronic device) of the electronic device 301.

The example embodiments may be applied to various communication devices and systems that are implemented based on the WLAN and various electronic devices and systems that include the communication devices and systems. For example, the example embodiments may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of detecting synchronization timing and a sub-band, the method comprising:

receiving an input signal corresponding to a training sequence;

generating a template signal based on the input signal and a reference signal, the reference signal being a single predetermined reference signal;

performing a matched filtering operation on the input signal based on the template signal;

calculating an adaptive threshold for detecting a target sub-band among a plurality of sub-bands based on a result of the matched filtering operation;

calculating a peak tone for the target sub-band based on the result of the matched filtering operation; and determining whether the input signal corresponds to the target sub-band and a synchronization timing for the input signal based on the adaptive threshold and the peak tone.

2. The method of claim 1, wherein the adaptive threshold is calculated by windowing a part of the input signal and has a variable value depending on the input signal.

3. The method of claim 2, wherein calculating the adaptive threshold includes:

measuring noise power by performing a windowing operation around a target position of the input signal; and obtaining the adaptive threshold based on the noise power.

4. The method of claim 3, wherein the noise power and the adaptive threshold are obtained based on Equation 1 and Equation 2, respectively, $$Q_b(n) = \frac{1}{L_{win}} \sum_{l=L_{shift}}^{L_{win}+L_{shift}-1} |a_{y,b}(l)| \tilde{=} E\{|a_{y,b}(n)|_{n\neq 0}\} \quad \text{[Equation 1]}$$

$$T_b(n) = \frac{|a_{y,b}(0)| + |a_{y,b}(n)|_{n\neq 0}}{2} = \beta + \gamma \cdot Q_b(n) \quad \text{[Equation 2]}$$

where $Q_b(n)$ denotes the noise power, $T_b(n)$ denotes the adaptive threshold, n denotes a sample index, $L_{win}$ denotes a window size for the windowing operation, $L_{shift}$ denotes a shift value for the windowing operation, $|a_{y,b}(0)|$ and $|a_{y,b}(n)|_{n\neq 0}$ denote cross-correlation function (CCF) values, and β and γ denote constant values.

5. The method of claim 3, wherein a plurality of sampling values and a plurality of sample indices associated with the plurality of sampling values are obtained by sampling the input signal, and wherein the target position of the input signal corresponds to one of the plurality of sample indices.

6. The method of claim 1, wherein the peak tone is obtained based on Equation 3, $$P_b(0) = \frac{N_{MF}}{N_B} \sum_{l=0}^{L_{target}-1} |h_b[l]|^2 \quad \text{[Equation 3]}$$

where $P_b(0)$ denotes the peak tone, $N_{MF}$ denotes a length of filter coefficients for the matched filtering operation, $N_B$ denotes a number of valid sub-bands included in a wideband, $L_{target}$ denotes a window size for a windowing operation, and $h_b(\cdot)$ denotes an impulse response of a sub-band channel.

7. The method of claim 1, wherein generating the template signal includes:

calling a look-up table (LUT) corresponding to the reference signal, the look-up table being a single look-up table;

obtaining a frequency bandwidth of the input signal;

obtaining a sub-band index of the input signal; and obtaining the template signal based on the look-up table, the frequency bandwidth and the sub-band index.

8. The method of claim 7, wherein filter coefficients for the matched filtering operation correspond to complex numbers, and wherein the look-up table includes only real numbers.

9. The method of claim 8, wherein the look-up table is formed in a ternary scheme such that each of the real numbers included in the look-up table correspond to one of +1, 0 and −1.

10. The method of claim 7, wherein obtaining the template signal includes:

calculating an index of a real number part of the template signal;

calculating an index of an imaginary number part of the template signal;

calculating a sign of the real number part of the template signal; and calculating a sign of the imaginary number part of the template signal.

11. The method of claim 10, wherein the real number part of the template signal and the imaginary number part of the template signal are obtained based on Equation 4 and Equation 5, respectively, $$RE(x_{N,b}(n)) = R\left(IDX_{RE}\left(\frac{N_{Max}}{N}n, b\right), n\right) \times S_{RE}\left(\frac{N_{Max}}{N}n, b\right) \quad \text{[Equation 4]}$$

$$IM(x_{N,b}(n)) = R\left(IDX_{IM}\left(\frac{N_{Max}}{N}n, b\right), n\right) \times S_{IM}\left(\frac{N_{Max}}{N}n, b\right) \quad \text{[Equation 5]}$$

where $x_{N,b}(n)$ denotes the template signal, n denotes a sample index, RE(·) denotes a function of obtaining the real number part, IM(·) denotes a function of obtaining the imaginary number part, R(m,n) denotes a real number included in the look-up table, $IDX_{RE}(\cdot)$ denotes the index of the real number part of the template signal, $IDX_{IM}(\cdot)$ denotes the index of the imaginary number part of the template signal, $S_{RE}(\cdot)$ denotes the sign of the real number part of the template signal, $S_{IM}(\cdot)$ denotes the sign of the imaginary number part of the template signal, $N_{Max}$ denotes a maximum number of sub-bands included in a wideband, N denotes a number of samples, and b denotes the sub-band index of the input signal.

12. The method of claim 1, wherein determining whether the input signal corresponds to the target sub-band and the synchronization timing for the input signal includes:

in response to the peak tone being greater than the adaptive threshold, detecting the target sub-band; and in response to the peak tone being greater than the adaptive threshold, setting the synchronization timing for the input signal based on the target sub-band.

13. The method of claim 1, further comprising:

setting a valid range based on the result of the matched filtering operation, and wherein calculating the adaptive threshold, calculating the peak tone, and determining whether the input signal corresponds to the target sub-band and the synchronization timing for the input signal are performed only on the valid range.

14. The method of claim 1, wherein the input signal is received through a wireless channel of a wireless communication system, wherein the wireless channel has a frequency bandwidth of a wideband including the plurality of sub-bands, and wherein the target sub-band is determined from among the plurality of sub-bands.

15. The method of claim 14, wherein the template signal includes:

a first template signal corresponding to a first sub-band among the plurality of sub-bands; and a second template signal corresponding to a second sub-band different from the first sub-band among the plurality of sub-bands, and wherein both the first template signal and the second template signal are generated based on the reference signal.

16. The method of claim 14, wherein, in response to the input signal corresponding to two or more sub-bands among the plurality of sub-bands, the synchronization timing for the input signal is determined based on all of the two or more sub-bands.

17. A receiver comprising:

a template generator configured to generate a template signal based on an input signal and a reference signal, the input signal corresponding to a training sequence, the reference signal being a single predetermined reference signal;

a first calculator configured to receive the input signal, and to perform a matched filtering operation on the input signal based on the template signal; and a second calculator configured to calculate an adaptive threshold for detecting a target sub-band among a plurality of sub-bands based on a result of the matched filtering operation, to calculate a peak tone for the target sub-band based on the result of the matched filtering operation, and to determine whether the input signal corresponds to the target sub-band and a synchronization timing for the input signal based on the adaptive threshold and the peak tone.

18. The receiver of claim 17, wherein the template generator includes:

a storage unit configured to store a look-up table corresponding to the reference signal, the look-up table being a single look-up table;

a sub-band selecting unit configured to obtain a sub-band index of the input signal; and a template obtaining unit configured to obtain the template signal based on the look-up table, a frequency bandwidth of the input signal and the sub-band index.

19. The receiver of claim 17, wherein the second calculator includes:

a threshold calculating unit configured to calculate the adaptive threshold based on the result of the matched filtering operation;

a peak tone calculating unit configured to calculate the peak tone based on the result of the matched filtering operation; and a detecting and setting unit configured to determine whether the input signal corresponds to the target sub-band and the synchronization timing for the input signal based on the adaptive threshold and the peak tone.

20. A method of detecting synchronization timing and sub-band, the method comprising:

receiving an input signal corresponding to a training sequence;

generating a template signal based on the input signal and a reference signal, the reference signal being a single reference signal;

performing a matched filtering operation on the input signal based on the template signal;

setting a valid range based on a result of the matched filtering operation;

calculating an adaptive threshold for detecting a target sub-band based on the result of the matched filtering operation and the valid range;

calculating a peak tone for the target sub-band based on the result of the matched filtering operation and the valid range; and determining whether the input signal corresponds to the target sub-band and a synchronization timing for the input signal based on the adaptive threshold and the peak tone, wherein calculating the adaptive threshold includes:

measuring noise power by performing a windowing operation around a target position of the input signal; and obtaining the adaptive threshold based on the noise power, and wherein generating the template signal includes:

calling a pre-stored look-up table (LUT) corresponding to the reference signal, the look-up table being a single look-up table;

obtaining a frequency bandwidth of the input signal;

obtaining a sub-band index of the input signal; and obtaining the template signal based on the look-up table, the frequency bandwidth and the sub-band index.

* * * * *